US 11,328,425 B2

(12) United States Patent
Okada et al.

(10) Patent No.: US 11,328,425 B2
(45) Date of Patent: May 10, 2022

(54) IMAGE PROCESSING APPARATUS AND NON-TRANSITORY COMPUTER READABLE MEDIUM

(71) Applicant: FUJIFILM Business Innovation Corp., Tokyo (JP)

(72) Inventors: Shigeru Okada, Kanagawa (JP); Shusaku Kubo, Kanagawa (JP); Masanori Yoshizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 119 days.

(21) Appl. No.: 16/541,174

(22) Filed: Aug. 15, 2019

(65) Prior Publication Data
US 2020/0242773 A1 Jul. 30, 2020

(30) Foreign Application Priority Data
Jan. 25, 2019 (JP) .............................. JP2019-011385

(51) Int. Cl.
*G06T 7/11* (2017.01)
*G06T 7/136* (2017.01)
*G06T 7/70* (2017.01)
*H04N 1/327* (2006.01)

(52) U.S. Cl.
CPC .............. *G06T 7/11* (2017.01); *G06T 7/136* (2017.01); *G06T 7/70* (2017.01); *H04N 1/32776* (2013.01); *G06T 2207/10008* (2013.01); *G06T 2207/30176* (2013.01)

(58) Field of Classification Search
CPC ..... G06T 7/10; G06T 7/11; G06T 7/12; G06T 7/70; G06T 7/73; G06T 2207/10008; G06T 2207/30176; H04N 1/32776; H04N 1/32773
USPC ................. 382/171, 173, 175–181, 184, 190
See application file for complete search history.

(56) References Cited

U.S. PATENT DOCUMENTS

| 7,016,536 | B1 * | 3/2006 | Ling ....................... G06T 5/006 382/190 |
| 2003/0198398 | A1 * | 10/2003 | Guan ...................... G06T 5/003 382/255 |
| 2011/0229035 | A1 * | 9/2011 | Sohma ............... G06K 9/00469 382/176 |
| 2017/0161596 | A1 * | 6/2017 | Kobayashi ......... H04N 1/00795 |
| 2017/0187915 | A1 * | 6/2017 | Baba .................. G06K 15/1825 |
| 2018/0336684 | A1 * | 11/2018 | Yaegashi ............ G06K 9/00442 |

FOREIGN PATENT DOCUMENTS

| JP | 2005051383 | 2/2005 |
| JP | 2006333248 | 12/2006 |

* cited by examiner

*Primary Examiner* — Sean M Conner
*Assistant Examiner* — Stephen M Brinich
(74) *Attorney, Agent, or Firm* — JCIPRNET

(57) ABSTRACT

An image processing apparatus includes a search unit that searches a search area, which is a part of a first image extending over two pages included in the first image, for a dividable area, the first image being indicated by first image data and a division unit that generates second image data indicating two second images, each of which corresponds to one of the two pages, by dividing the first image along a dividing line passing through, in a second direction, which is perpendicular to a first direction, the dividable area found by the search unit, the first direction being a direction across the two pages.

16 Claims, 33 Drawing Sheets

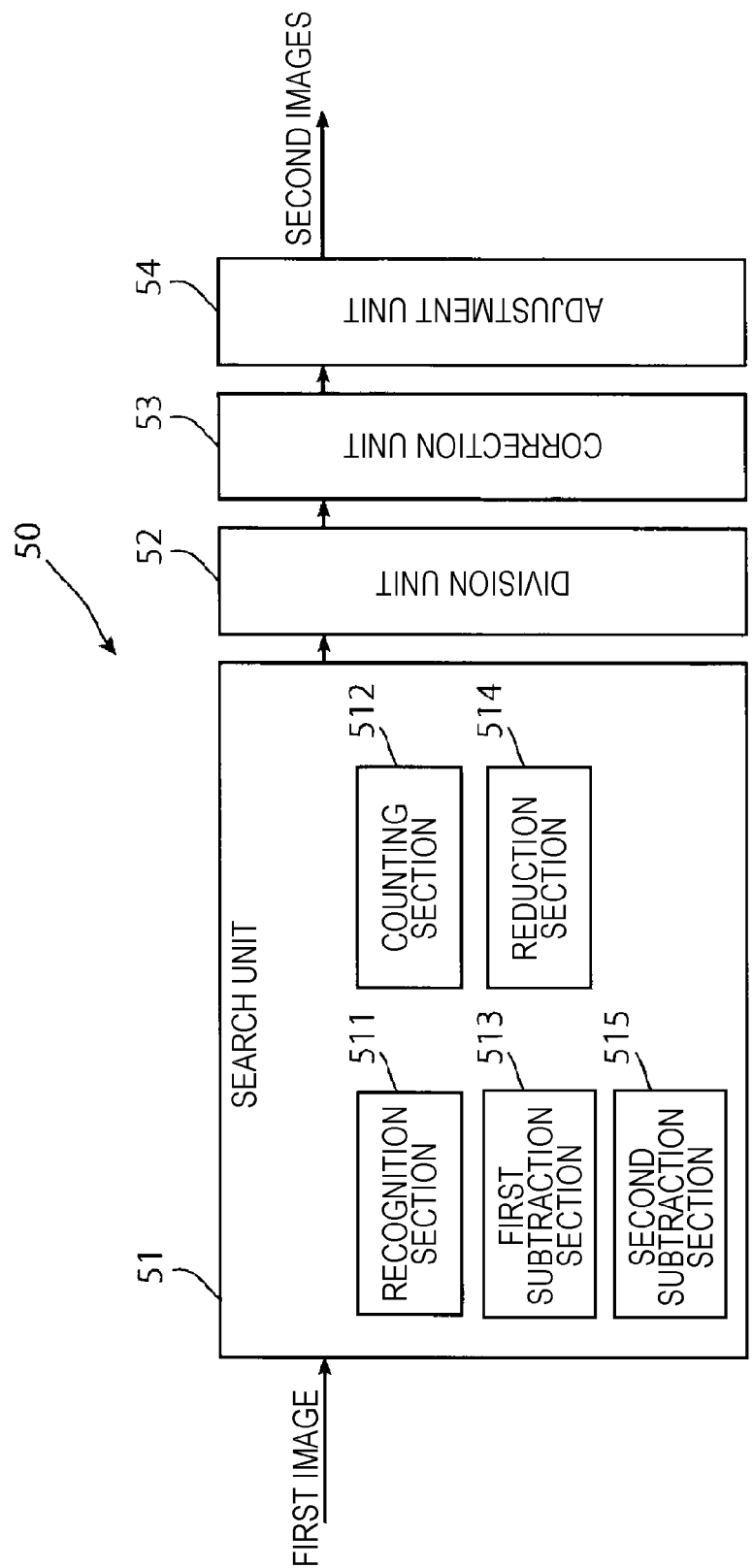

|      | ( X,    | Y,    | W,   | H)   |
|------|---------|-------|------|------|
| (1)  | (    0, |  600, | 800, | 200) |
| (2)  | (    0, | 1000, | 800, | 200) |
| (3)  | (    0, | 1500, | 800, | 200) |
| (4)  | (    0, | 2000, | 800, | 200) |
| (5)  | (    0, | 2500, | 800, | 200) |
| (6)  | (    0, | 3000, | 800, | 200) |
| (7)  | (1500,  |  600, | 980, | 200) |
| (8)  | (1500,  | 1000, | 980, | 200) |
| (9)  | (1500,  | 1500, | 980, | 200) |
| (10) | (1500,  | 2000, | 980, | 200) |
| (11) | (1500,  | 2500, | 980, | 200) |

FIG. 16

|      | (   X,    Y,    W,    H) |
|------|--------------------------|
| (1)  | (   0,  600, 800, 200)   |
| (2)  | (   0, 1000, 800, 200)   |
| (3)  | (   0, 1500, 800, 200)   |
| (4)  | (   0, 2000, 800, 200)   |
| (5)  | (   0, 2500, 800, 200)   |
| (6)  | (   0, 3000, 800, 200)   |
| (7)  | (1500,  600, 980, 200)   |
| (8)  | (1500, 1000, 980, 200)   |
| (9)  | (1500, 1500, 980, 200)   |
| (10) | (1500, 2000, 980, 200)   |
| (11) | (1500, 2500, 980, 200)   |
| (12) | (1125, 1700, 150, 150)   |
| (13) | (1012, 1800, 150, 150)   |

| | ( X, Y, W, H) |
|---|---|
| (7) | (1500, 600, 980, 200) |
| (8) | (1500, 1000, 980, 200) |
| (9) | (1500, 1500, 980, 200) |
| (10) | (1500, 2000, 980, 200) |
| (11) | (1500, 2500, 980, 200) |

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-011385 filed Jan. 25, 2019.

BACKGROUND

(i) Technical Field

The present disclosure relates to an image processing apparatus and a non-transitory computer readable medium.

(ii) Related Art

There have been demands that a scanner should read two pages in a book as a single image and an apparatus should divide the single image into two images corresponding to the two pages and output the two images as files. In this case, the apparatus can simply divide an image of a fixed size in two at the center of the image, but needs to divide an image of a non-fixed size at a different position. It is therefore not clear for the apparatus where to divide images.

Japanese Unexamined Patent Application Publication No. 2005-51383 proposes detection of a boundary area through, for example, recognition of non-text areas based on shapes of edges near a boundary around which characters do not exist and a black-and-white histogram of pixels.

SUMMARY

When an image is divided on the basis of a histogram of pixels of the entirety of the image, however, a plurality of non-text areas might appear in the case of an image that includes few characters and many blanks, for example, and the image might be divided at a wrong position.

Aspects of non-limiting embodiments of the present disclosure relate to an image processing apparatus and a non-transitory computer readable medium capable of accurately dividing an image at a right position in a boundary area, unlike when an image is divided on the basis of a histogram of pixels of the entirety of an image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a search unit that searches a search area, which is a part of a first image extending over two pages included in the first image, for a dividable area, the first image being indicated by first image data and a division unit that generates second image data indicating two second images, each of which corresponds to one of the two pages, by dividing the first image along a dividing line passing through, in a second direction, which is perpendicular to a first direction, the dividable area found by the search unit, the first direction being a direction across the two pages.

BRIEF DESCRIPTION OF THE DRAWINGS

An exemplary embodiment of the present disclosure will be described in detail based on the following figures, wherein:

FIG. 3 is a functional block diagram illustrating a process relating to page consecutive capturing performed by an image processing apparatus illustrated in FIG. 2 as a block;

FIG. 16 is a diagram illustrating coordinates of text areas illustrated in FIG. 15;

DETAILED DESCRIPTION

An exemplary embodiment of the present disclosure will be described hereinafter.

Figure 1:
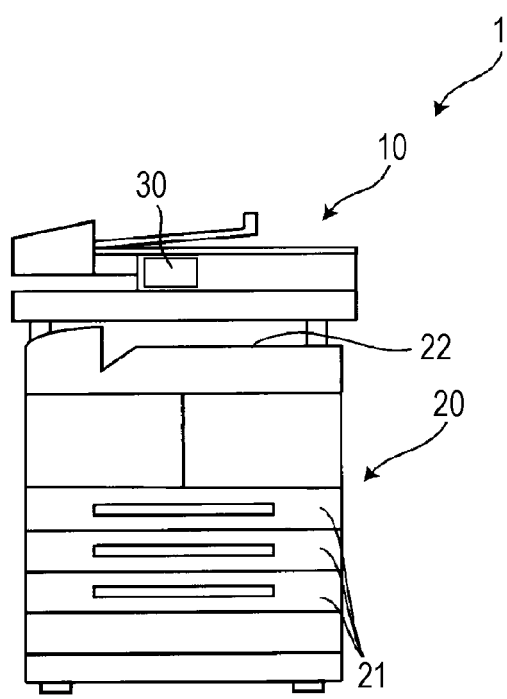
FIG. 1 is a diagram illustrating the appearance of a multifunction peripheral (MFP) into which an exemplary embodiment of the present disclosure is incorporated.

FIG. 1 is a diagram illustrating the appearance of an MFP into which the exemplary embodiment of the present disclosure is incorporated.

An MFP 1 includes a scanner 10 and a printer 20. The scanner 10 reads images recorded on documents. The read images are transmitted to a personal computer (PC), which is not illustrated, or the like.

The MFP 1 also includes sheet trays 21 storing sheets to be subjected to printing. The MFP 1 receives image data transmitted from the PC, which is not illustrated, or the like. The printer 20 prints an image based on the input image data on a sheet obtained from one of the sheet trays 21, and the sheet on which the image has been printed is conveyed to a sheet stage 22.

The MFP 1 has a copy function. When copying is performed, the scanner 10 reads an image on a sheet first. The printer 20 then prints an image based on image data obtained as a result of the reading. The MFP 1 also has other functions such as a facsimile function. Because the other functions are irrelevant to the present exemplary embodiment, however, description of the other functions is omitted.

The MFP 1 includes a touch panel 30 that serves as a UI. Various pieces of information for a user are displayed on the touch panel 30, and the user operates the touch panel 30 to input various instructions.

Figure 2:
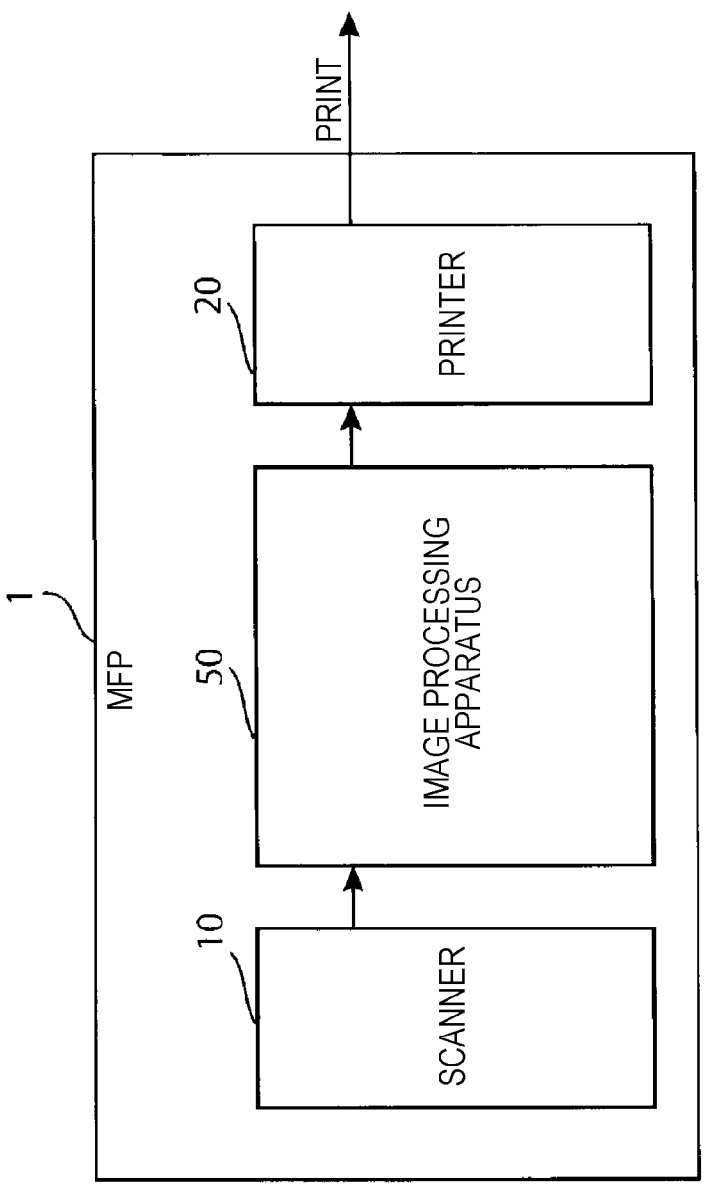
FIG. 2 is a block diagram illustrating a process performed by the MFP whose appearance is illustrated in FIG. 1.

FIG. 2 is a block diagram illustrating a process performed by the MFP 1 whose appearance is illustrated in FIG. 1. FIG. 2 illustrates only processing blocks necessary to describe characteristics of the present exemplary embodiment.

The MFP 1 includes an image processing apparatus 50 as well as the scanner 10 and the printer 20 described with reference to FIG. 1. Image data obtained by the scanner 10 is subjected to image processing in the image processing apparatus 50 and transmitted to the printer 20. The printer 20 prints an image based on the image data subjected to the image processing on a sheet. The image processing apparatus 50 includes hardware as a computer that executes programs and software to be executed by the hardware. The image processing apparatus 50 is an exemplary embodiment of an image processing apparatus in the present disclosure.

In the present exemplary embodiment, the scanner 10 reads a document of two pages as a single image, and the image processing apparatus 50 converts image data indicating the read image obtained as a result of the reading into image data indicating two one-page images. This function will be referred to as "page consecutive capturing" herein. Page consecutive capturing will be described hereinafter.

In the following description, an image on a document or a sheet and image data obtained by reading an image on a document will not be distinguished from each other and will be referred to as an "image" for the sake of simplicity. An image of two pages read by the scanner 10 will be referred to as a "first image" or "first image data", and images obtained by dividing the first image in two will be referred to as "second images" or "second image data".

FIG. 3 is a functional block diagram illustrating a process relating to the page consecutive capturing performed by the image processing apparatus 50 illustrated in FIG. 2 as a block. A function of the image processing apparatus 50 relating to the page consecutive capturing, too, is achieved by a combination of the hardware as a computer that executes programs and the software to be executed by the hardware. A specific example of the present exemplary embodiment will be described hereinafter later, and the present exemplary embodiment will be schematically described with reference to FIG. 3.

The image processing apparatus 50 includes a search unit 51 and a division unit 52.

The search unit 51 searches a search area, which is a part of a two-page first image extending over two pages, for a dividable area. In the present exemplary embodiment, a central part of the first image whose length in a first direction is half that of the first image is set as the search area. The configuration of the search unit 51 will be described after the other functional blocks are described.

The division unit 52 generates two one-page second images by dividing the first image along a dividing line extending in a direction (hereinafter referred to as a "second direction") perpendicular to a direction across the two pages (hereinafter referred to as a "first direction"), the dividing line passing through the dividable area found by the search unit 51.

The image processing apparatus 50 also includes a correction unit 53 and an adjustment unit 54.

The correction unit 53 and the adjustment unit 54 perform post-processing on the two second images generated by the division unit 52.

If the first image is obtained by reading two pages in a thick book using the scanner 10, for example, characters on the two pages might be skewed. The characters on the two pages are usually skewed in opposite directions, and it is difficult to adjust the skew in the first image. In the second images, which are obtained by dividing the first image in two, however, the characters on the two pages are usually skewed in the same direction. The correction unit 53 of the image processing apparatus 50 corrects the skew of text areas of the two second images generated by the division unit 52.

The division unit 52 does not necessarily divide the first image at the center of the first image in the first direction (the direction across the two pages). The two resultant second images might therefore be different from each other in dimension in the first direction. In this case, the adjustment unit 54 adjusts dimensions of the two second images to the same value.

The division unit 52 thus divides a first image in two, the correction unit 53 corrects skew of characters on two second images, and the adjustment unit 54 adjusts dimensions of the two second images.

Next, the configuration of the search unit 51 will be described.

The search unit 51 includes a recognition section 511. The recognition section 511 recognizes, on the basis of a software operation for performing optical character recognition/reader (OCR), text areas of a first image obtained as a result of reading performed by the scanner 10. The recognition section 511, however, performs OCR only within a search area, which is a part of the first image extending over two pages. In OCR, characters in an image and coordinates of the characters in the image (text area) are recognized, and the division unit 52 uses information regarding the coordinates of the characters in the image (text area). OCR software is a widely known technique, and description thereof is omitted here.

The search unit 51 also includes a counting section 512. The counting section 512 counts the number of text areas arranged in the second direction for each of a plurality of pixels arranged in the first direction. The plurality of pixels in the first direction need not necessarily be a plurality of successive pixels but may be a plurality of intermittent pixels. Because the size of each character can be estimated from a dimension of each text area in the second direction, for example, the number of text areas may be counted for each of pixels arranged at intervals of about one-tenth of the dimension of each character. The search unit 51 then searches for a dividable area on the basis of the distribution of values obtained by the recognition section 511.

A method for searching for a dividable area used by the search unit 51 will be described hereinafter.

In a first example of the present exemplary embodiment, the search unit 51 searches for a first dividable area A1 in which there are, in the first direction, a first successive threshold K1 or more pixels associated with values obtained by the counting section 512 equal to or smaller than a first count threshold C1. After the first dividable area A1 is found, the division unit 52 divides a first image P1 along a dividing line DL passing through the first dividable area A1.

In a second example of the present exemplary embodiment, a first dividable area A1 is searched for as follows. That is, in the second example, first, the search unit 51 searches for a first dividable area A1 in which there are, in the first direction, the first successive threshold K1 or more pixels whose values obtained by the counting section 512 are zero. If there is such a first dividable area A1, the division unit 52 divides a first image P1 along a dividing line DL passing through the first dividable area A1.

The search unit 51 includes a first subtraction section 513 in case there is no first dividable area A1 in which the value of zero continues. If there is no first dividable area A1 in which the value of zero continues, the first subtraction section 513 decreases one by one the value of each pixel for which the number of text areas has been counted. Meanwhile, the search unit 51 monitors whether a first dividable area A1 appears as a result of the decrease in the value of each pixel. Here, a lower limit of the value of each pixel is zero. If a first dividable area A1 in which the value of zero continues more than the first successive threshold K1 before the first subtraction section 513 decreases the value of each pixel more than the first count threshold C1, that is, before the first subtraction section 513 subtracts the first count threshold C1 from the value of each pixel, the division unit 52 divides a first image P1 along a dividing line DL passing through the first dividable area A1.

If a first dividable area A1 does not appear even after the first subtraction section 513 subtracts the first count threshold C1 from the value of each pixel, the division unit 52 no longer attempts to find a dividable area and divides the first image P1 at a geometrically central position in the first direction in the first and second examples. For example, the division unit 52 divides the first image P1 along a dividing line DL passing through the center, in the first direction, of a search area SR in which OCR has been performed.

In a third example that will be described hereinafter, however, a dividable area continues to be searched for in the following manner even if a first dividable area A1 does not appear. The search unit 51 according to the present exemplary embodiment includes a reduction section 514 in case a first dividable area A1 does not appear.

The reduction section 514 causes the counting section 512 to operate again after reducing in size text areas recognized by the recognition section 511. As a result of the reduction of the text areas, an area regarded as a non-text area appears between adjacent two text areas. The counting section 512 is caused to operate again with the text areas reduced. If the number of text areas arranged in the second direction is counted in this state, an area in which there is no text area or few text areas in the second direction can appear. Here, the reduction section 514 reduces text areas little by little. The search unit 51 monitors whether a second dividable area A2 in which there are a second successive threshold K2 or more pixels in the first direction whose values are equal to or smaller than a second count threshold C2 has appeared as a result of the reduction performed by the reduction section 514. If a second dividable area A2 appears while the reduction section 514 is successively reducing the text areas more than a first time threshold R1, the division unit 52 divides a first image P1 along a dividing line DL passing through the second dividable area A2.

If such a second dividable area A2 does not appear in the third example, the division unit 52 no longer attempts to find a dividable area and divides the first image P1 along a dividing line DL passing through the center, in the first direction, of a search area SR subjected to OCR.

The present exemplary embodiment also prepares a fourth example. If a second dividable area A2 does not appear as a result of the reduction of text areas performed by the reduction section 514 in the fourth example, a dividable area continues to be searched for in the following manner. The search unit 51 according to the present exemplary embodiment is provided with a second subtraction section 515 in case a second dividable area A2 does not appear in the third example.

The second subtraction section 515 decreases one by one a value of each pixel for which the number of text areas has been counted. It is to be noted that the second subtraction section 515 decreases one by one a value of each pixel at a time when the number of text areas has been counted by repeatedly causing the reduction section 514 to operate the same number of times as the first count threshold R1.

The search unit 51 then monitors whether a second dividable area A2 has appeared while the second subtraction section 515 is decreasing the value of each pixel one by one. If a second dividable area A2 appears before the second subtraction section 515 is caused to operate more than the second count threshold C2, the division unit 52 divides the first image P1 along a dividing line DL passing through the second dividable area A2.

If such a second dividable area A2 is not found even in the fourth example, however, the division unit 52 unavoidably divides the first image P1 along a dividing line DL passing through the center, in the first direction, of the search area SR subjected to OCR.

The present exemplary embodiment thus includes the first to fourth examples. Specific examples of the four examples will be sequentially described hereinafter.

FIGS. 4A to 4D are diagrams illustrating UI screens successively displayed on the touch panel 30 when the MFP 1 illustrated in FIG. 1 performs the page consecutive capturing.

Figure 4A:
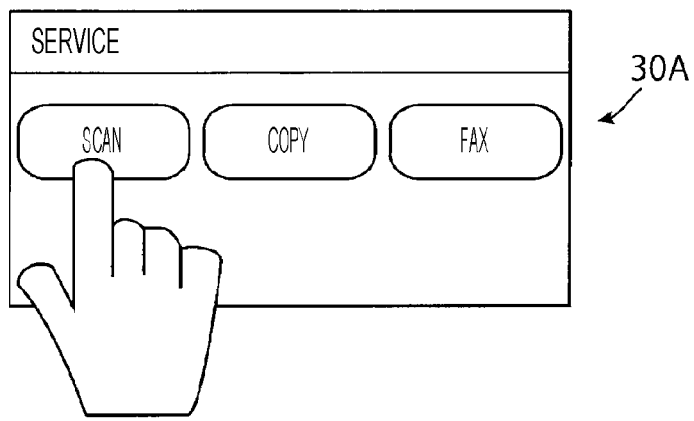
FIGS. 4A to 4D are diagrams illustrating user interface (UI) screens successively displayed on a touch panel when the MFP illustrated in FIG. 1 performs the page consecutive capturing.
Figure 4B:
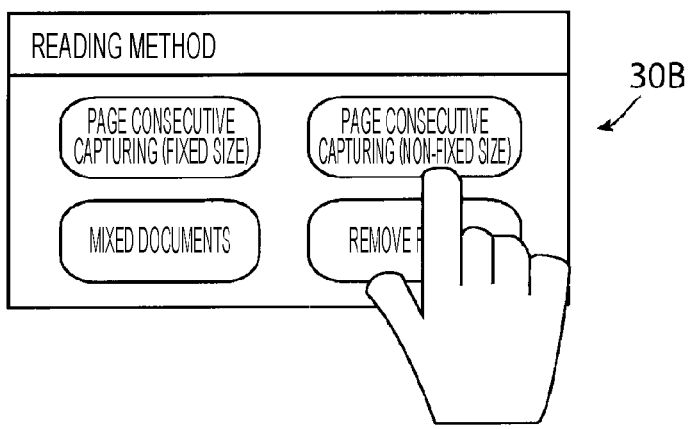

First, the user touches a "scan" button on a menu screen 30A illustrated in FIG. 4A. The UI screen changes to a "reading method" selection screen 30B illustrated in FIG. 4B. The user touches "page consecutive capturing (non-fixed size)". The UI screen changes to a "specify reading size" screen 30C illustrated in FIG. 4C. The user selects A3 size, for example, on the screen 30C. If the size of a document can be identified through automatic detection, for example, the "specify reading size" screen 30C illustrated in FIG. 4C may be omitted. As a result of the selection of reading size on the screen 30C, the UI screen changes to a "specify writing direction" screen 30D illustrated in FIG. 4D. The user specifies vertical writing or horizontal writing on the screen 30D for the document. In the case of vertical writing, a right page is a first page, and in the case of horizontal writing, a left page is a first page. This is because first and second pages obtained by dividing an image in two are different between vertical writing and horizontal writing.

Figure 5:
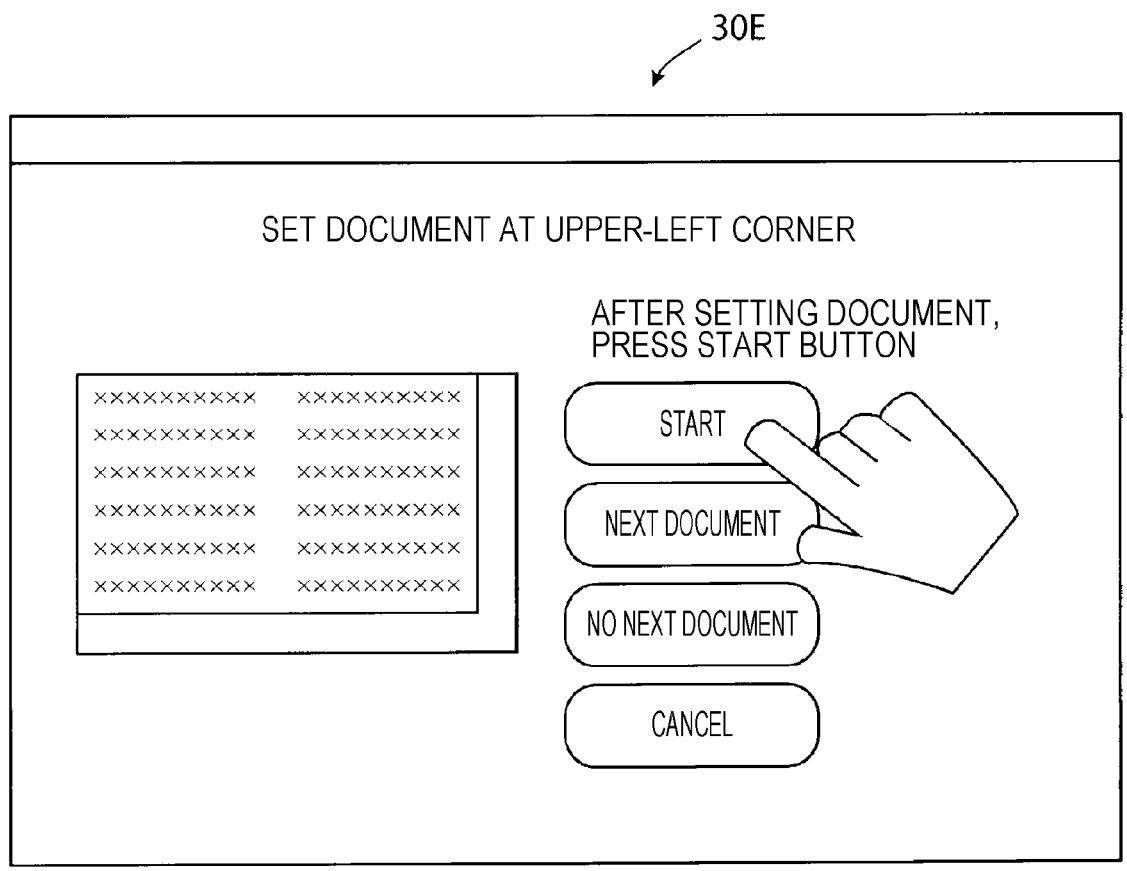
FIG. 5 is a diagram illustrating a UI screen for starting reading by a scanner.

FIG. 5 is a diagram illustrating a UI screen 30E for starting reading by the scanner 10.

The UI screen 30E illustrated in FIG. 5 includes an illustration indicating that a document should be set to an upper-left corner and various buttons such as "start", "next document", "no next document", and "cancel".

If the user sets a document of two pages on the scanner 10 (refer to FIG. 1) and presses the "start" button, page consecutive capturing starts with reading of the document.

Figure 6:
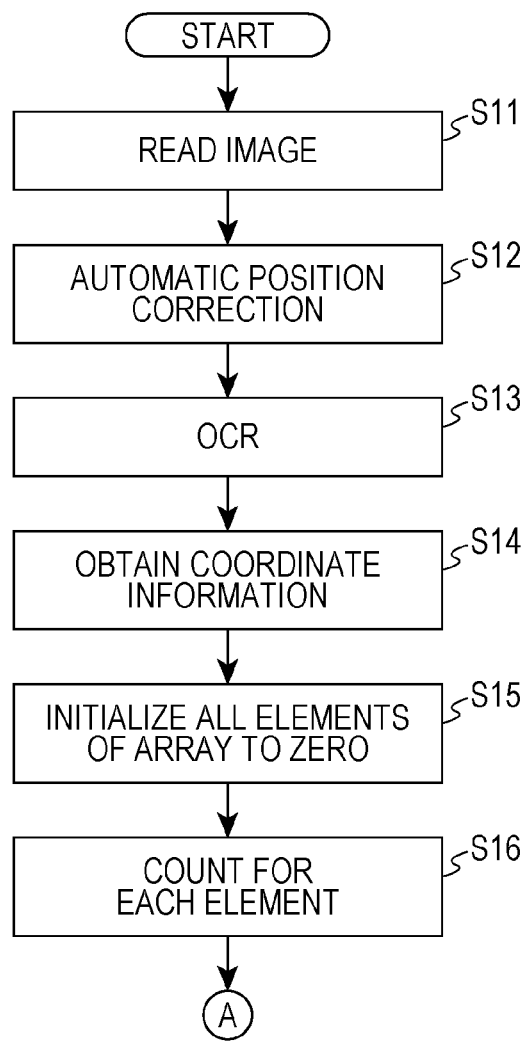
FIG. 6 is a flowchart illustrating a first half of the page consecutive capturing.

FIG. 6 is a flowchart illustrating a first half of the page consecutive capturing.

First, an image on a document is read in the above procedure (step S11), and automatic position correction is performed (S12). The automatic position correction is a process performed to rotate a document when, for example, the document has been set and read upside-down. In the automatic position correction, OCR is performed on some characters in an image, a direction of the characters is identified on the basis of a result of the OCR, and the image is rotated such that the characters are correctly positioned. The OCR will be described with reference to step S13.

Figure 7:
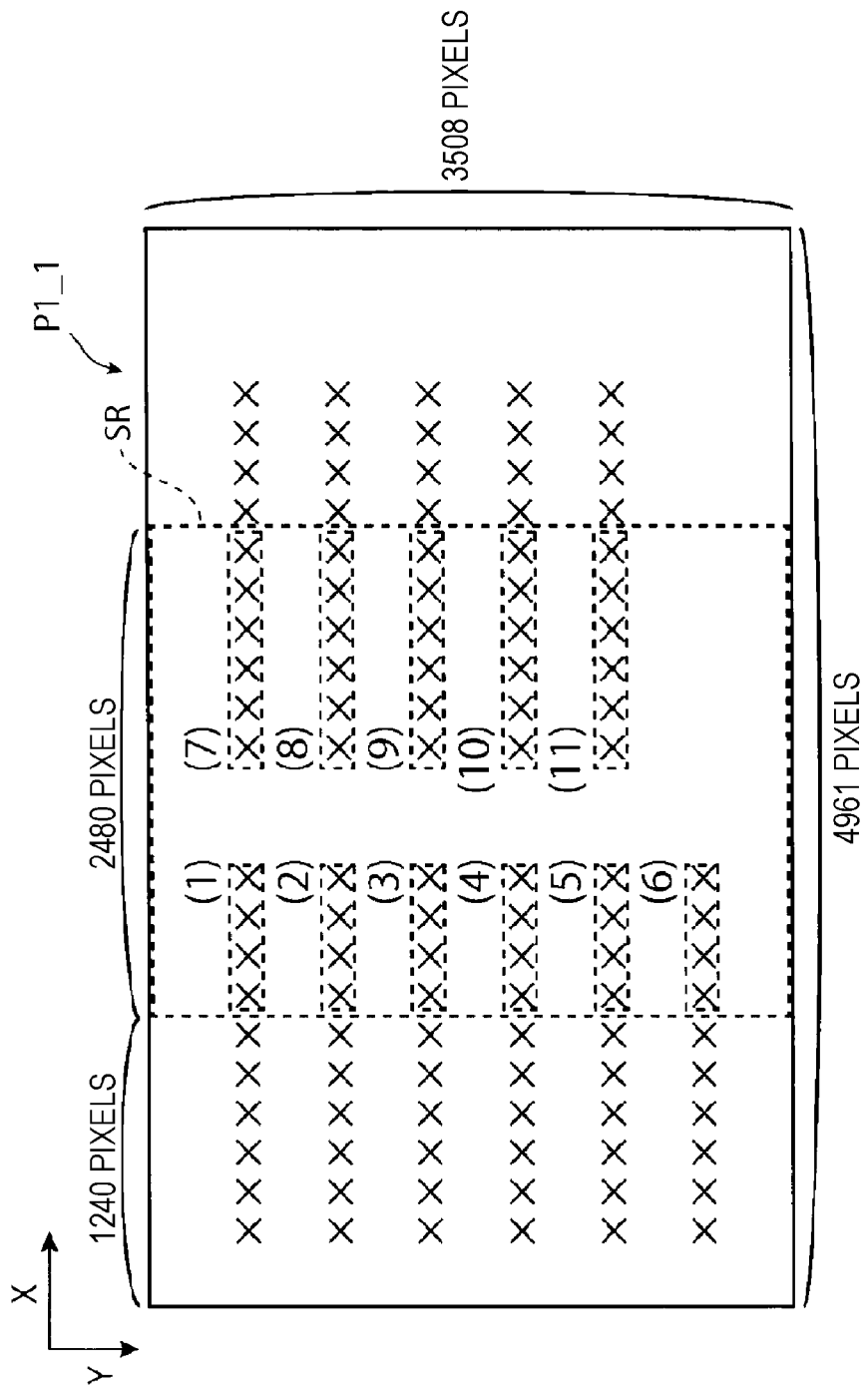
FIG. 7 is a diagram illustrating an example of an image obtained as a result of the reading performed by the scanner.

FIG. 7 is a diagram illustrating an example of an image obtained as a result of the reading performed by the scanner 10. X's on the image indicate characters.

Figure 4C:
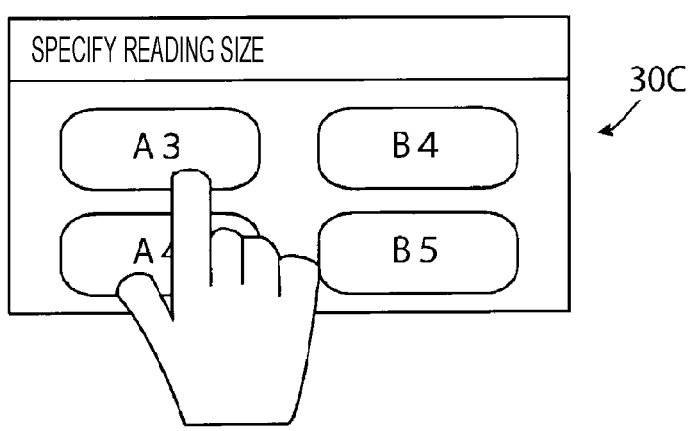
Figure 4D:
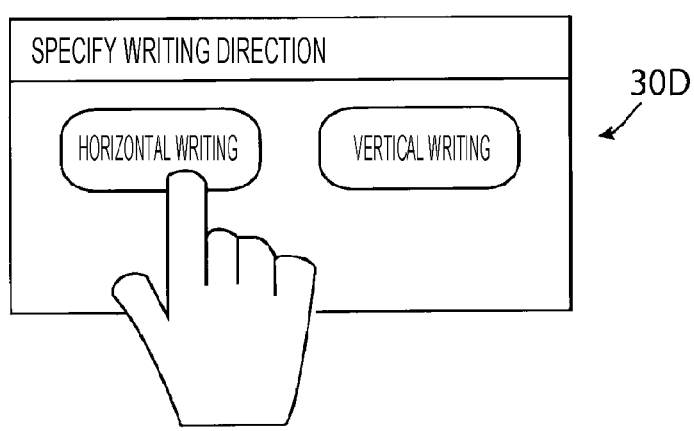

It is assumed here that the user has selected "A3" on the "specify reading size" screen 30C illustrated in FIG. 4C and reading has been performed within an area of A3 size with a resolution of 300 dots per inch (dpi). In this case, image data including 4,961 pixels in a longitudinal direction (a lateral direction or an X direction) of an image and 3,508 pixels in a vertical direction (Y direction) is obtained. In the example illustrated in FIG. 7, however, a document from which the image has been read is smaller than A3 size, and a gap between a left edge of the image and a left end of the characters is smaller than a gap between a right edge of the image and a right end of the characters.

The image data obtained in this manner will be referred to as "first image data" here. As described above, when an image on a document or a sheet is not distinguished from image data and is simply called an "image", the first image data will be referred to as a "first image". In order to distinguish the first image illustrated in FIG. 7 from first images illustrated in other figures, the first image illustrated in FIG. 7 will be referred to as a "first image P1_1".

After the reading of the image on the document (step S11) and the automatic position correction (step S12) are completed, OCR (hyperlink "https://en.wikipedia.org/wiki/Optical_character_recognition") is performed (step S13). Here, the OCR is performed within a search area SR indicated in FIG. 7 by a broken line, which is half as large as the first image P1_1 and located at the center of the first image P1_1 in a horizontal direction indicated by an arrow X. The search area SR is an area extending over two pages of the first image P1_1 and an example of a search area in the present disclosure. The X direction across the two pages of the first image P1_1 is an example of a first direction in the present disclosure. A Y direction perpendicular to the first direction is an example of a second direction in the present disclosure.

Coordinates of rectangular text areas are identified as a result of the OCR, and coordinate information is obtained (step S14). In the example illustrated in FIG. 7, coordinate information regarding text areas indicated by broken lines surrounding characters indicated by X's is obtained. In FIG. 7, left text areas (1) to (6) and right text areas (7) to (11) have been recognized as a result of the OCR. OCR is a widely known technique, and further description thereof is omitted here.

Figures 8, 9:
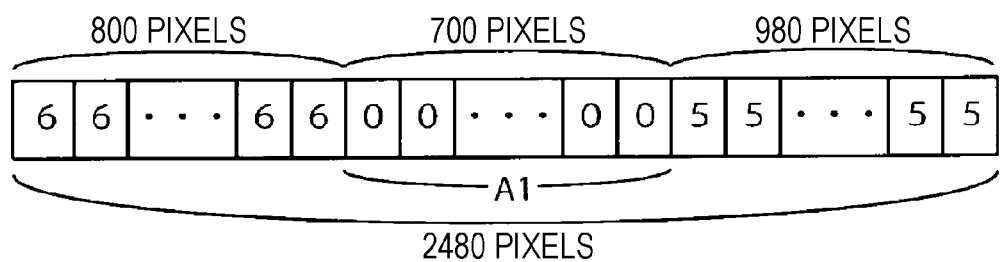
FIG. 8 is a diagram illustrating coordinates of rectangular text areas illustrated in FIG. 7.
FIG. 9 is a diagram illustrating an array prepared in step S15 illustrated in FIG. 6.

FIG. 8 is a diagram illustrating the coordinates of the rectangular text areas illustrated in FIG. 7. "X" and "Y" in FIG. 8 indicate an X coordinate and a Y coordinate, respectively, of an upper-left corner of each text area. The X and Y coordinates are represented by the number of pixels at a time when an upper-left corner of the search area SR is determined as an origin. "W" and "H" indicate a width (X direction) and a height (Y direction), respectively, of each text area. The width and the height, too, are represented by the number of pixels.

The X coordinate of the text area (1), for example, is 0, which means that characters in the text area (1) begin at a left edge of the search area SR. The Y coordinate of the text area (1) is 600, which means that the text area (1) is located 600 pixels below an upper edge of the search area SR, that is, an upper edge of the first image P1_1. The "W" of the text area (1) is 800, which means that the text area (1) extends over 800 pixels in the horizontal direction (X direction). The "H" of the text area (1) is 200, which means that the text area (1) extends over 200 pixels in the vertical direction (Y direction). The same holds for the text areas (2) to (11).

After the coordinate information regarding the text areas in the search area SR illustrated in FIG. 8 is obtained in step S14 illustrated in FIG. 6, an array including the same number of elements as the number of pixels of the search area SR in the X direction is prepared, and a value assigned to each element is initialized to zero (step S16).

FIG. 9 is a diagram illustrating the array prepared in step S15 illustrated in FIG. 6.

The array includes 2,480 elements, which is the number of pixels of the search area SR in the X direction. Values other than zero might have been associated with some elements of the array illustrated in FIG. 9, but all the elements are initialized to zero in step S15 illustrated in FIG. 6.

Next, the number of text areas in the vertical direction (Y direction) is counted for each element (step S16).

The text areas (1) to (6) in the search area SR illustrated in FIG. 7 are arranged in the Y direction and extend over 800 pixels in the X direction. A value of 6 is therefore assigned to first 800 elements of the array illustrated in FIG. 9 from a left end. There is a gap of 700 pixels between the text areas (1) to (6) and the text areas (7) to (11) in the search area SR illustrated in FIG. 7, and there is no text area over the 700 pixels in the Y direction. Values of 700 elements of the array illustrated in FIG. 9 starting at an 801th element from the left end therefore remain zero. A value of 5 is assigned to the remaining rightmost elements since the five text areas (7) to (11) are arranged in the Y direction.

Figure 10:
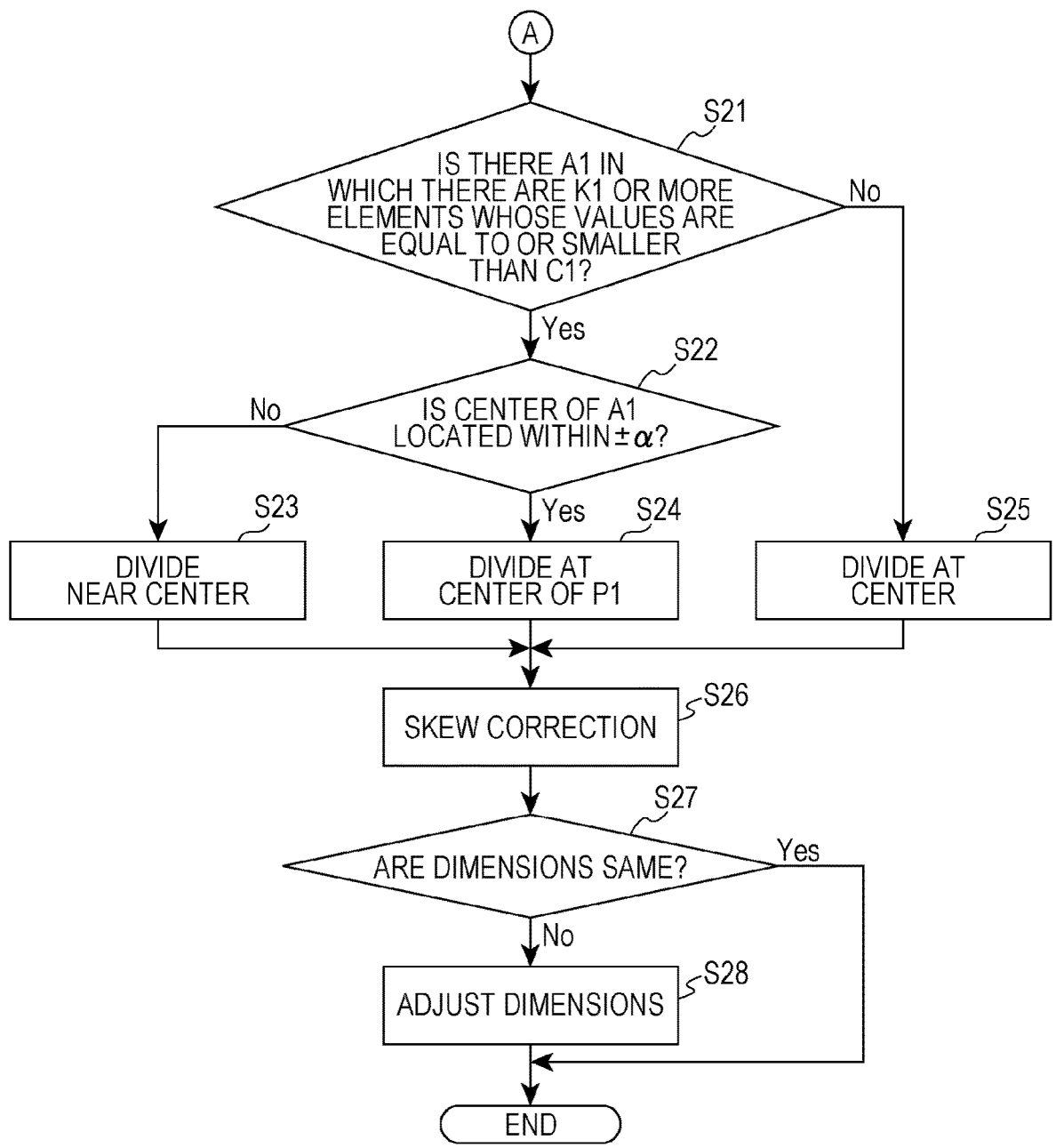
FIG. 10 is a flowchart illustrating a second half of the page consecutive capturing in a first example.

FIG. 10 is a flowchart illustrating a second half of the page consecutive capturing in the first example.

After the counting is performed in step S16 illustrated in FIG. 6 and values are assigned to the elements of the array (refer to FIG. 9), a determination is made in step S21 illustrated in FIG. 10. Here, whether there is a first dividable area A1 in which there are the first successive threshold K1 or more elements whose values are equal to or smaller than the first count threshold C1. It is assumed, for example, that the first count threshold C1 is 3 and the first successive threshold K1 is 500. In the array illustrated in FIG. 9, there is a first dividable area A1 in which there are the first successive threshold K1=500 or more, namely 700, elements whose values are equal to or smaller than the first count threshold C1=3. A result of step S21, therefore, is YES.

Next, whether the center of the first dividable area A1 is located within a range of ±α from the center of the search area SR is determined (step S22). It is assumed, for example, that a is 200. In FIG. 9, the center of the first dividable area A1 is located 800+700/2=1,150 elements away from the left end of the array (i.e., from the left edge of the search area SR). The width of the search area SR is 2,480 elements as illustrated in FIG. 7, and therefore the center of the search area SR is located 2,480/2=1,240 pixels away from the left edge of the search area SR. 1,150, which indicates the center of the first dividable area A1, is 90 smaller than 1,240, which indicates the center of the search area SR. That is, in this example, the center of the first dividable area A1 is located within the range of ±α from the center of the search area SR. In this example, therefore, a result of step S22 illustrated in FIG. 10 is YES, and the process proceeds to step S24. Cases where the result of step S21 is NO or the result of step S22 is NO will be described later.

If the result of step S22 is YES and the process proceeds to step S24, the first image P1_1 is divided at the center of the first dividable area A1, and two second images are generated. To describe this operation more accurately using the term "image data", an operation for dividing the first image P1_1 indicated by first image data is performed, and second image data indicating two second images is generated.

Figure 11:
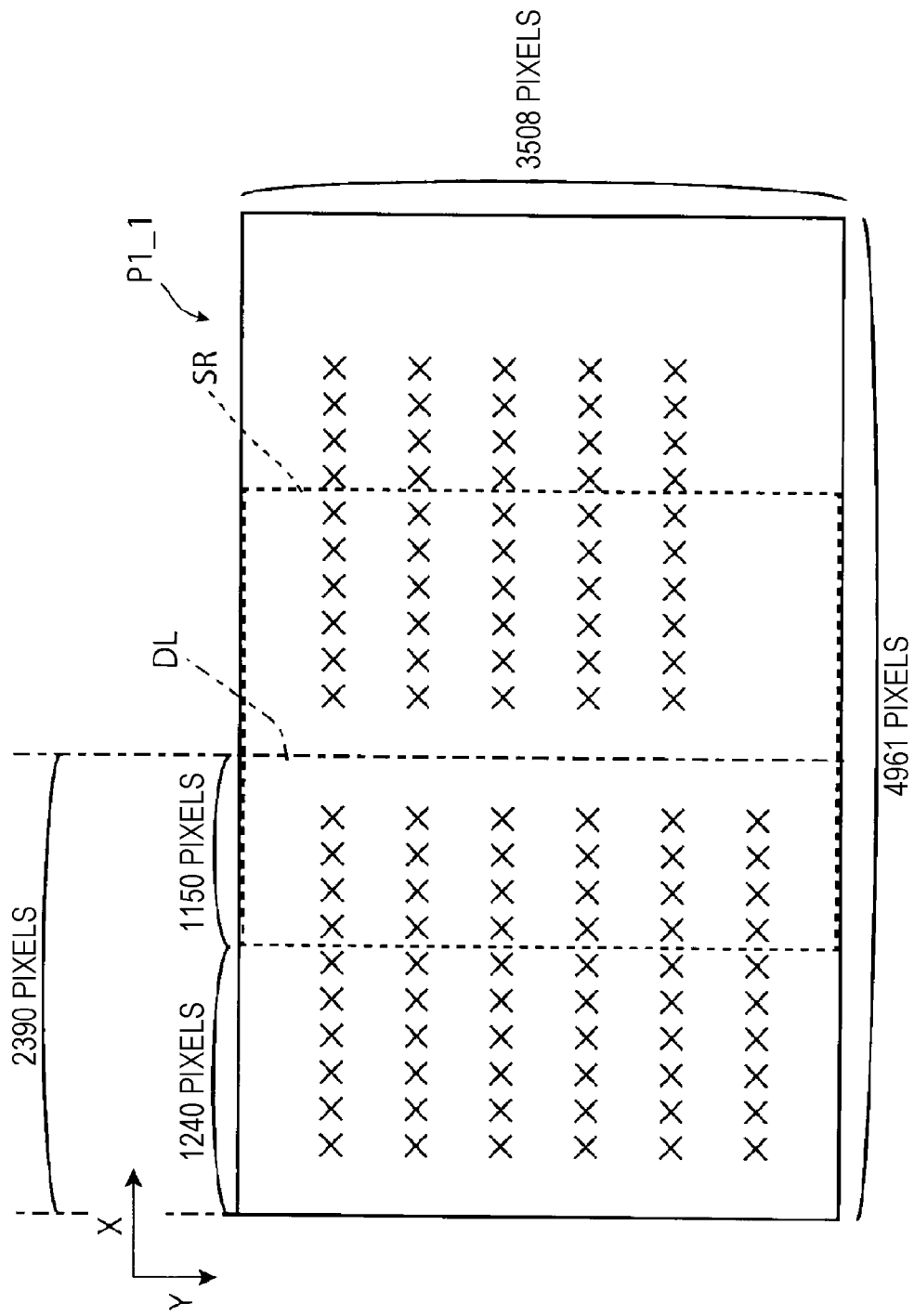
FIG. 11 is a diagram illustrating division.

FIG. 11 is a diagram illustrating the division.

The center of the first dividable area A1 is located at a 1,150th pixel from the left edge of the search area SR. As illustrated in FIG. 11, the left edge of the first image P1_1 is even 1,240 pixels leftward from the left edge of the search area SR. In this example, therefore, the first image P1_1 is divided along a dividing line DL extending in the vertical direction (Y direction) at 2,390 pixels rightward from the left edge thereof.

Skew correction is then performed on the two resultant images (step S26). The skew correction will be described later.

Next, whether dimensions of the two resultant images are the same is determined (step S27). In FIG. 11, the dividing line DL is located to the left of the center of the first image P1_1. It is therefore determined in step S26 that the dimensions of the two images are not the same. The process proceeds to step S28, and the dimensions of the images are adjusted.

Figure 12:
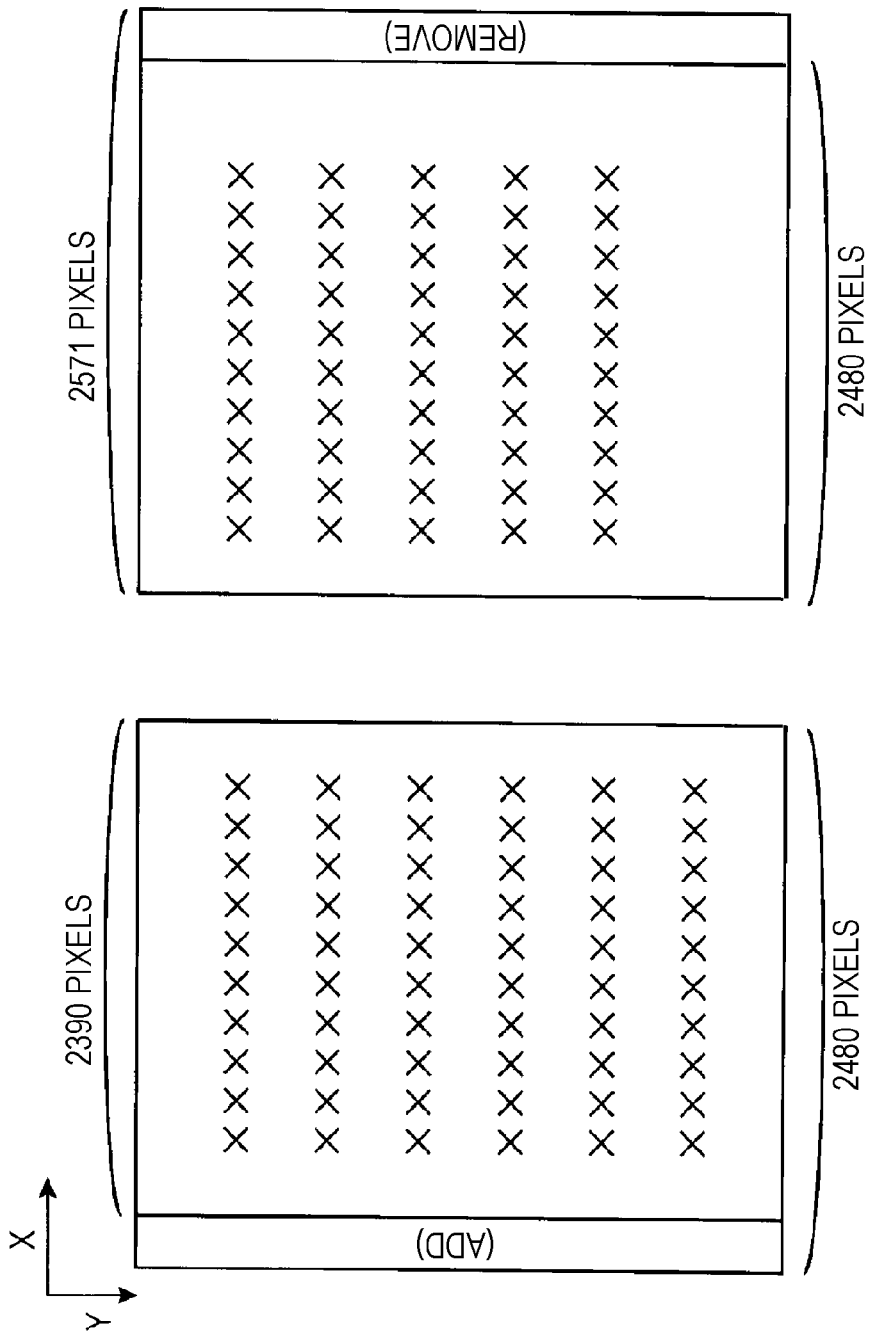
FIG. 12 is a diagram illustrating adjustment of dimensions.

FIG. 12 is a diagram illustrating the adjustment of the dimensions.

In this specific example, the dividing line DL is located to the left. This means that the left resultant image is shorter than the right resultant image in the X direction. In step S21, therefore, a blank part having a width of 2,480-2,390=90 pixels is added to the left of the left image, and a part having a width of 2,571-2,480=91 pixels is removed from the right image. The dividing line DL being located to the right indicates that the document read by the scanner 10 (refer to FIG. 1) is shorter than the reading size (refer to FIG. 4C) in the X direction. That is, the part to be removed from the right image obtained as a result of the division along the dividing line DL is a blank part.

If it is determined in step S21 illustrated in FIG. 10 that there is no first dividable area A1 in which there are the first successive threshold K1 or more elements whose values are equal to or smaller than the first count threshold C1, the process proceeds to step S25 in the first example. The first image P1_1 is divided in two along the dividing line DL passing through, in the Y direction, the center, in the X direction, of the search area SR. Division near the center performed in step S23 will be described later.

Figure 13:
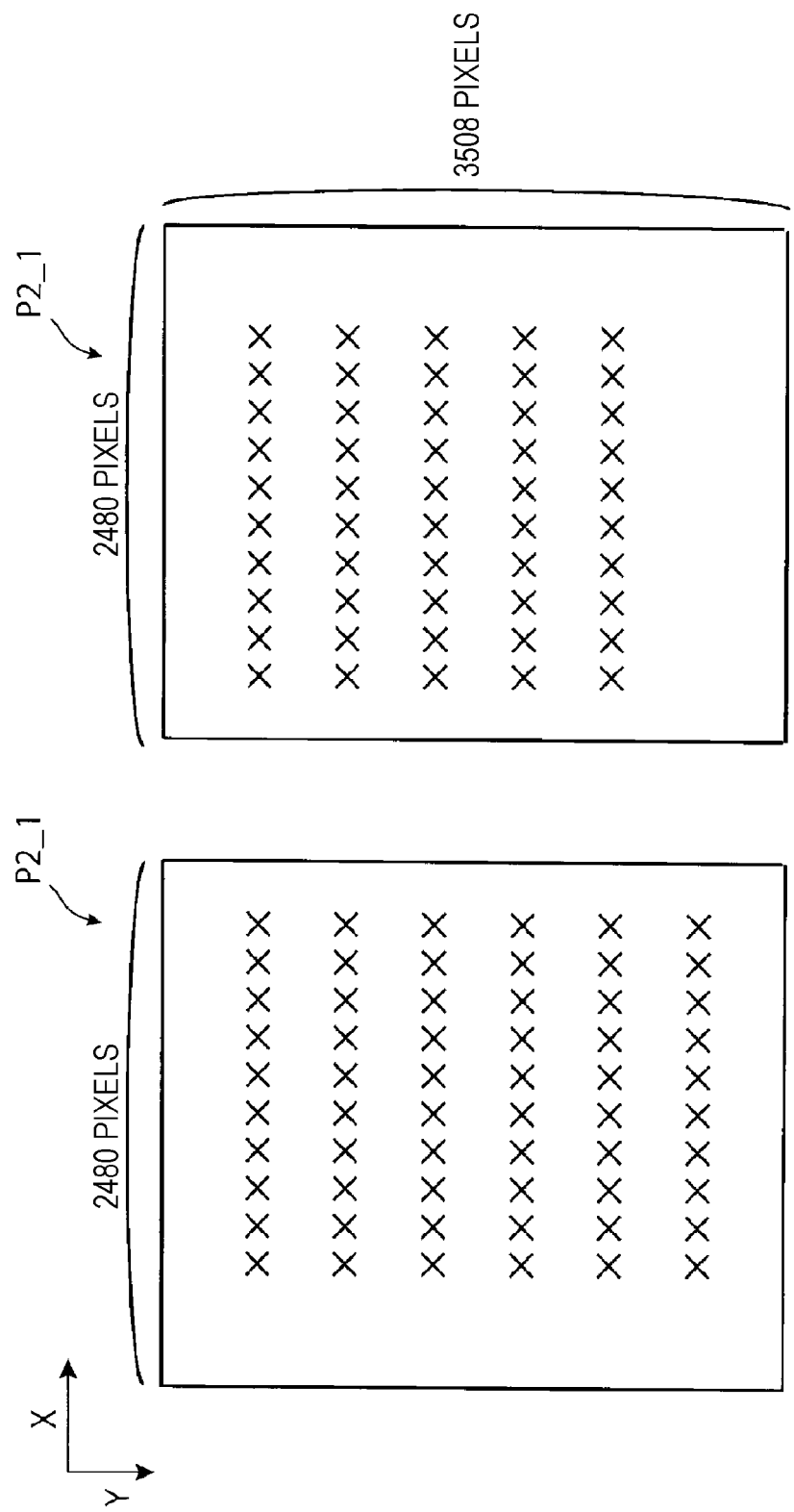
FIG. 13 is a diagram illustrating two final second images.

FIG. 13 is a diagram illustrating two final second images P2_1.

The two second images P2_1 are the same in dimension.

Figure 14:
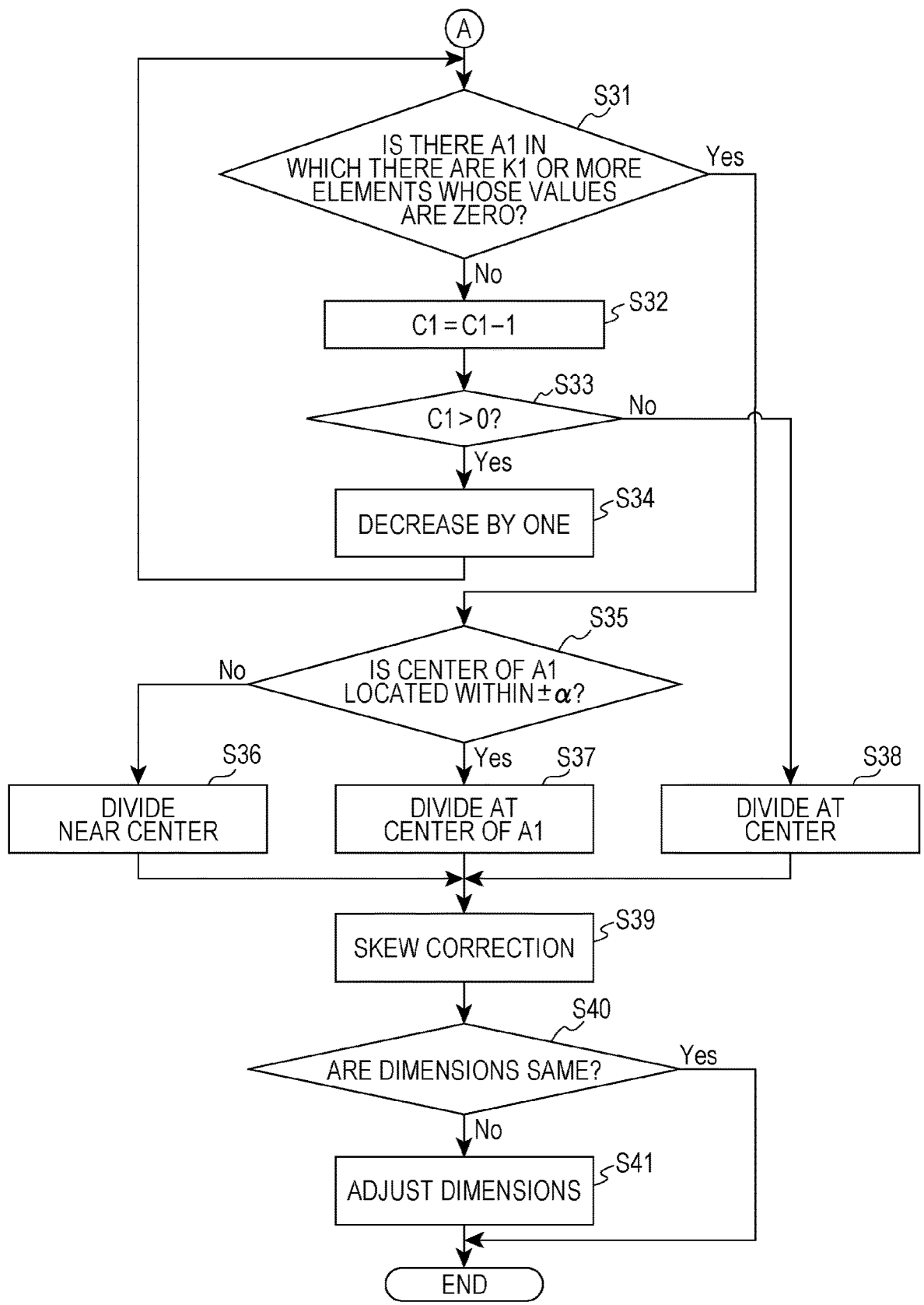
FIG. 14 is a flowchart illustrating a second half of the page consecutive capturing in a second example.

FIG. 14 is a flowchart illustrating a second half of the page consecutive capturing in the second example. A first half in the second example is the same as that in the first example, which is illustrated in FIG. 6, and redundant illustration and description thereof is omitted.

After the counting is performed in step S16 illustrated in FIG. 6 and the value is assigned to each element of the array (refer to FIG. 9), a determination is made in step S31 illustrated in FIG. 14. Steps S31 to S34 in the second example usually produce the same result as step S21 in the second half in the first example illustrated in FIG. 10.

In step S31, whether there is a first dividable area A1 in which there are the first successive threshold K1 or more elements whose values are zero is determined. As illustrated in FIG. 9, if the value of zero continues and there is no value other than zero, the first dividable area A1 in step S31 is the same as that in the first example. If there is an element whose value is equal to or smaller than the first count threshold C1 (e.g., C1=3), namely 2, for example, among values of zero in the array illustrated in FIG. 9, however, the first dividable area A1 in the first example and that in the second example might not be the same. In the first example, even if there is an element whose value is equal to or smaller than the first count threshold C1 but other than zero, an area in which there are the first successive threshold K1 or more elements whose values are equal to or smaller than the first count threshold C1, including the foregoing element, is determined as the first dividable area A1. In the second example, on the other hand, only successive elements whose values are zero are taken into consideration, and whether there is a first dividable area A1 in which there are the first successive threshold K1 or more elements whose values are zero is determined. If a value of an element located closer to an end of the 700 elements whose values are zero, namely an element 100 pixels leftward from a rightmost one of the 700 elements, is 2 in the array illustrated in FIG. 9, therefore, the first dividable area A1 in the second example is leftmost 600 of the 700 elements illustrated in FIG. 9 to which the value of zero has been assigned. In this case, the dividing line DL is located further leftward than in the first example. Such a difference is theoretically possible between the first and second examples, but the same result is produced in most cases.

Here, as in the first example, the first count threshold C1 is 3. The first successive threshold K1 is also 500 as in the first example. In the first example, that is, in the case of the first image P1_1 illustrated in FIG. 7, a result of step S31 is YES, and the process proceeds to step S35. Steps S35 to S41 are the same as steps S22 to S28, respectively, in the first example illustrated in FIG. 10, and redundant description thereof is omitted. Steps S23 and S26 illustrated in FIG. 10, however, have not been described. Step S23 illustrated in FIG. 10 will be described later with reference to step S36 illustrated in FIG. 14. Step S26 illustrated in FIG. 10, that is, step S39 illustrated in FIG. 14, will be also described later.

If it is determined in step S31 illustrated in FIG. 14 that there is no first dividable area A1 in which there are the first successive threshold K1 or more elements whose values are zero, the process proceeds to step S32. A specific example in which step S32 is performed will be described hereinafter.

Figure 15:
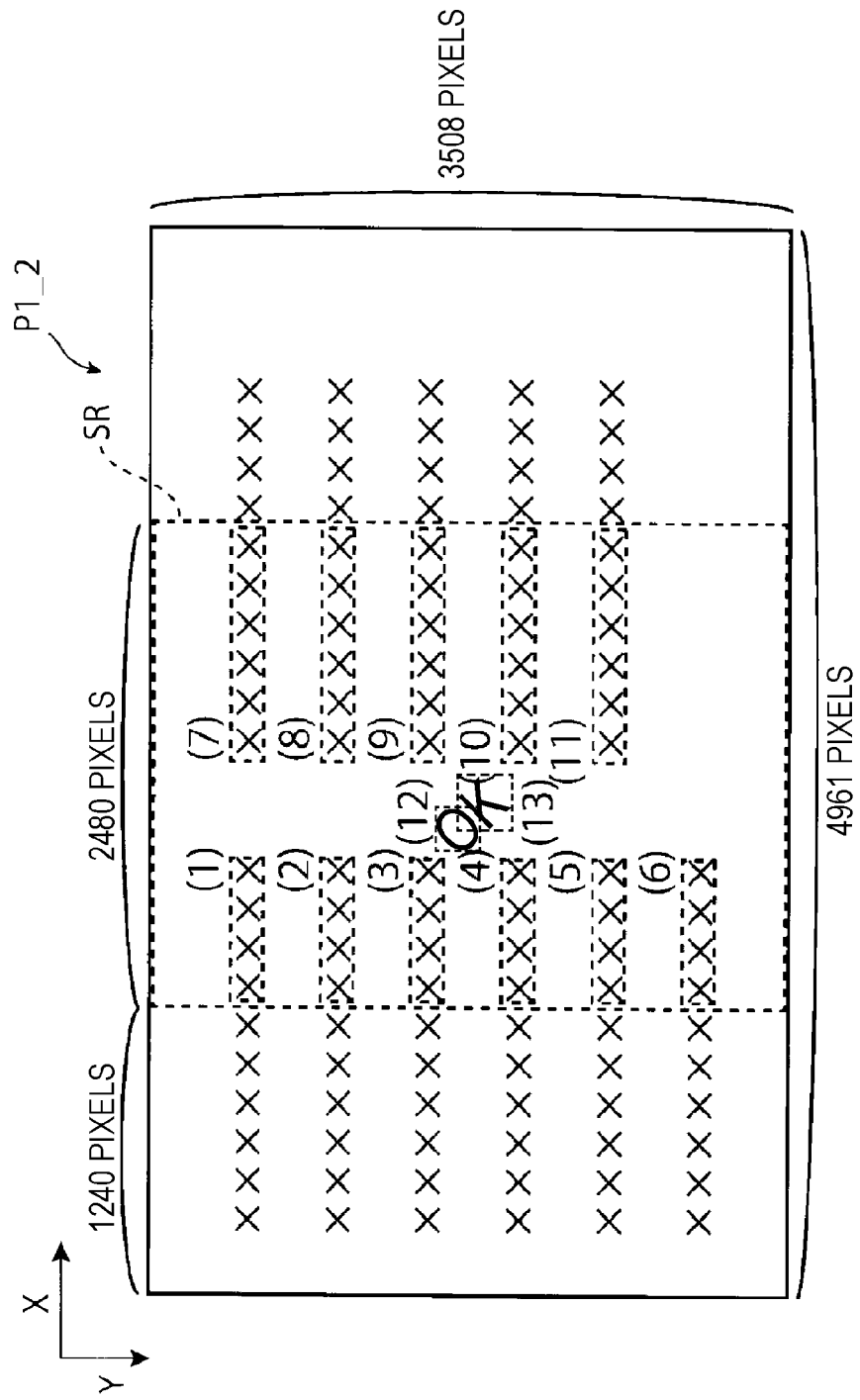
FIG. 15 is a diagram illustrating a first image different from a first image illustrated in FIG. 7.

FIG. 15 is a diagram illustrating a first image P12, which is different from the first image P1_1 illustrated in FIG. 7. The first image P1_2 illustrated in FIG. 15 is different from the first image P1_1 illustrated in FIG. 7 in that a slightly slanted word "OK" is written at supposedly the center of two pages. In this case, "0" and "K" have been recognized as discrete text areas along with the text areas (1) to (11) in the OCR performed in step S13 illustrated in FIG. 6. Here, the text areas of "0" and "K" are determined as text areas (12) and (13), respectively.

FIG. 16 is a diagram illustrating coordinates of the text areas (1) to (13) illustrated in FIG. 15. Meanings of "X", "Y", "W", and "H" in FIG. 16 are the same as in FIG. 8.

Here, coordinates of the text area (12) of "0" and coordinates of the text area (13) of "K" are added to the coordinates of the text areas (1) to (11) illustrated in FIG. 8.

Figure 17:
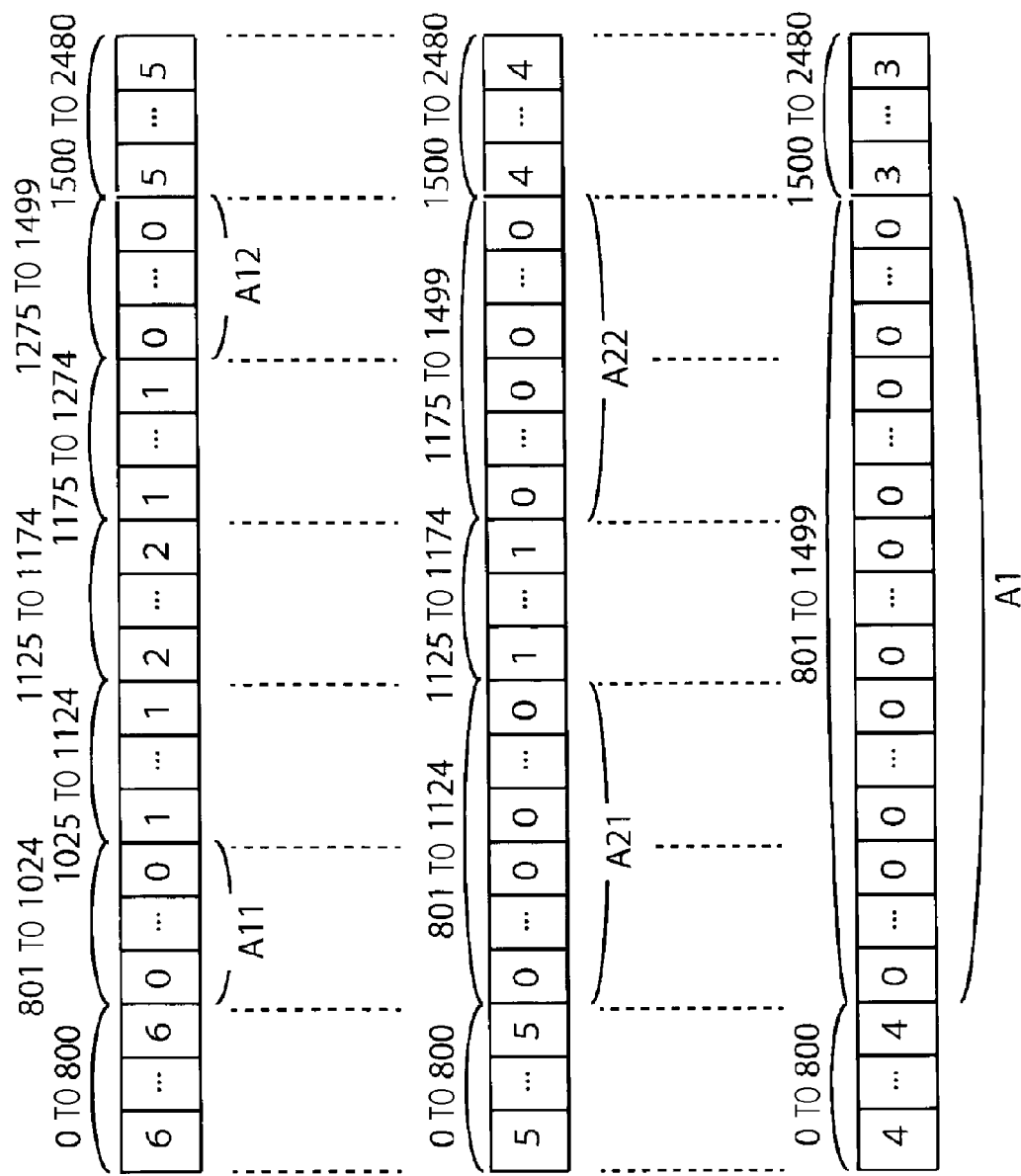
FIG. 17 is a diagram illustrating an array for the first image illustrated in FIG. 15 prepared in step S15 illustrated in FIG. 6 and a calculation method employing the array.

FIG. 17 is a diagram illustrating an array for the first image P1_2 illustrated in FIG. 15 prepared in step S15 illustrated in FIG. 6 and a calculation method employing the array.

A first array illustrated in FIG. 17 is an array relating to the first image P1_2 illustrated in FIG. 15 obtained in step S16 illustrated in FIG. 6. Since the word "OK" is included in the first image P1_2 illustrated in FIG. 15, there are two areas in which values of elements are zero, namely areas A11 and A12. The areas A11 and A12 do not satisfy the condition of the first successive threshold K1=500, that is, neither the area A11 nor the area A12 is a dividable area A1. In this case, the result of step S31 illustrated in FIG. 14 is NO, and the process proceeds to step S32. In step S32, the first count threshold C1 (an initial value is C1=3) is decreased by 1. Whether the first count threshold C1 (here, C1=2) after the decrease is larger than zero is then determined (step S33). Since the first count threshold C1 is 2, the process proceeds to step S34. In step S34, values of all elements of the first array illustrated in FIG. 17 are decreased by 1. A lower limit of the values, however, is zero. After the decrease, the process returns to step S31.

A second array illustrated in FIG. 17 is obtained by decreasing the values of all the elements of the first array illustrated in FIG. 17 by 1. In the second array illustrated in FIG. 17, too, there are two areas in which values of elements are zero, namely areas A21 and A22. The areas A21 and A22 do not satisfy the condition of the first successive threshold K1=500, that is, neither the area A21 nor the area A22 is a first dividable area A1. The process again proceeds to step S32 from step S31, and the first count threshold C1 is further decreased by 1. The first count threshold C1 becomes 1. Whether the first count threshold C1 is larger than zero is then determined in step S33. Although the first count threshold C1 is 1 here, the first count threshold C1 is still larger than zero, and the process proceeds to step S34 again. In step S34, the values of all the elements of the second array illustrated in FIG. 17 are decreased by 1 to generate a third array illustrated in FIG. 17. The process again returns to step S31. In step S31, the third array illustrated in FIG. 17 is referred to. The third array illustrated in FIG. 17 includes a first dividable area A1 in which there are the first successive threshold K1=500 or more elements whose values are zero. The result of step S31 becomes YES, and the process proceeds to step S35. Processing performed thereafter has been described above except for steps S36 and S39. A loop of steps S31 to S34 is repeated again, and after the result of step S33 becomes NO, the process proceeds to step S38. The first image P1_2 is divided in two along a dividing line DL passing through, in the Y direction, the center, in the X direction, of the search area SR. A specific example in which the result of step S33 is NO will be described later.

Figure 18:
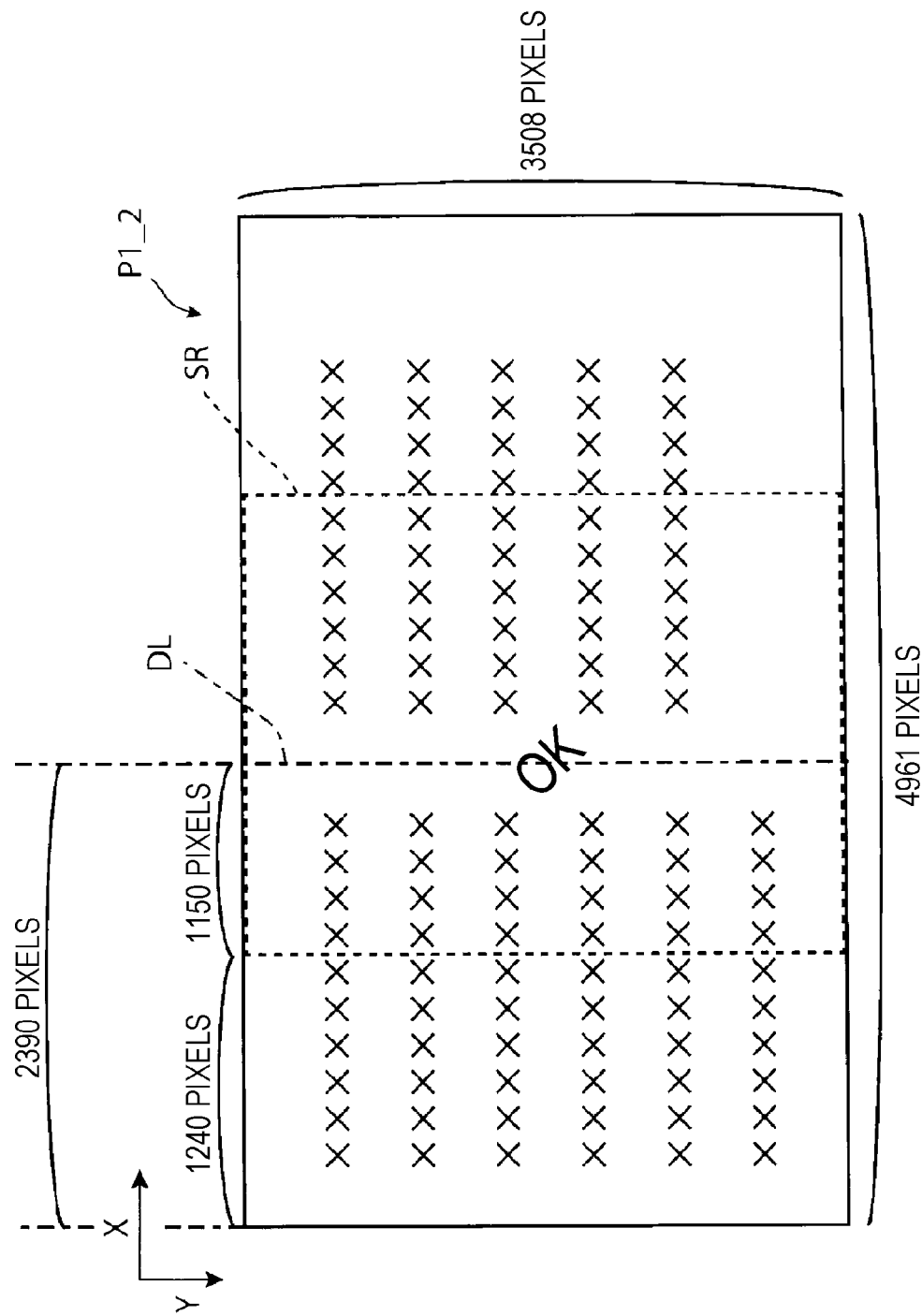
FIG. 18 is a diagram illustrating division of the first image illustrated in FIG. 15.

FIG. 18 is a diagram illustrating the division of the first image P12 illustrated in FIG. 15.

Figure 19:
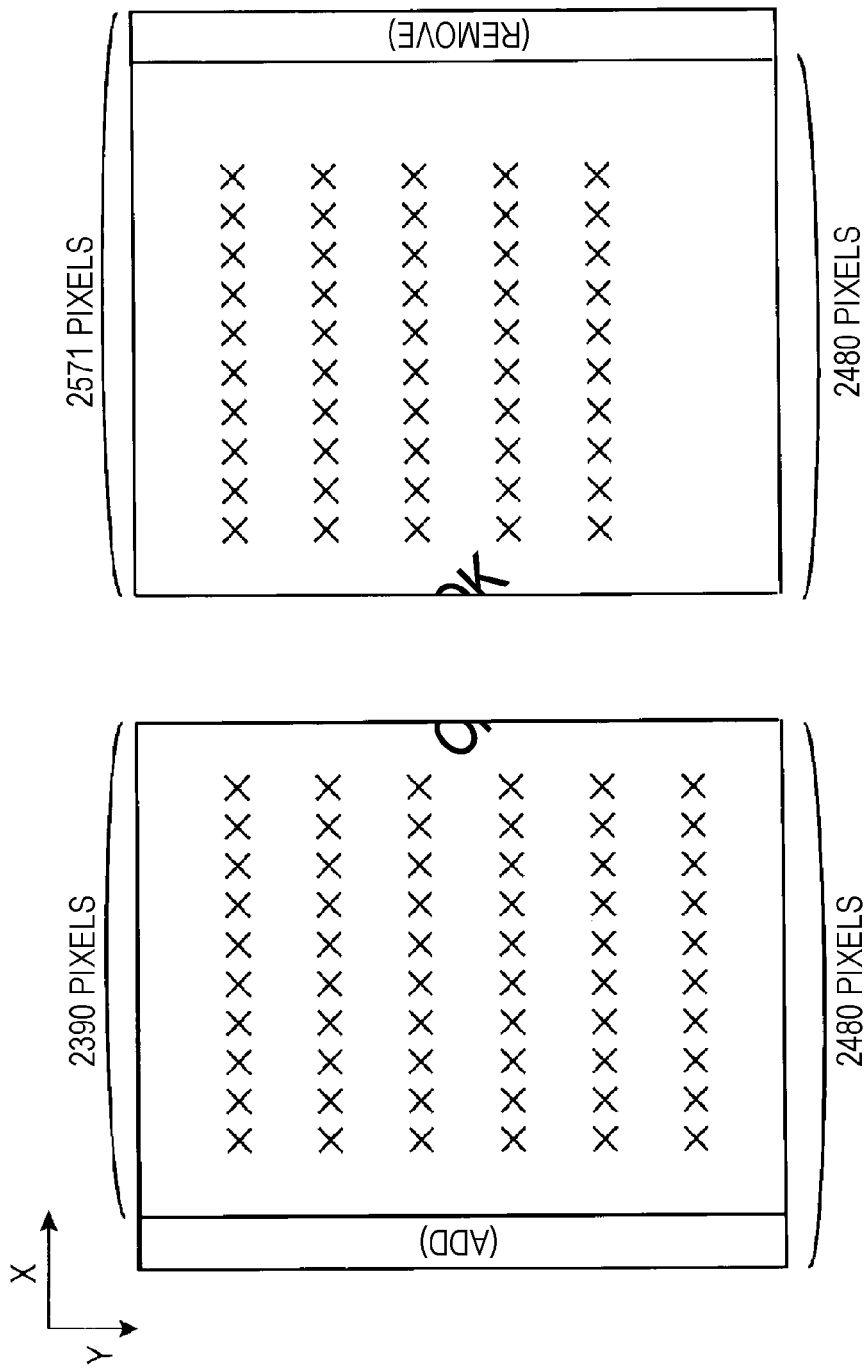
FIG. 19 is a diagram illustrating adjustment of dimensions relating to the first image illustrated in FIG. 15.

FIG. 19 is a diagram illustrating adjustment of dimensions relating to the first image P12 illustrated in FIG. 15.

Figure 20:
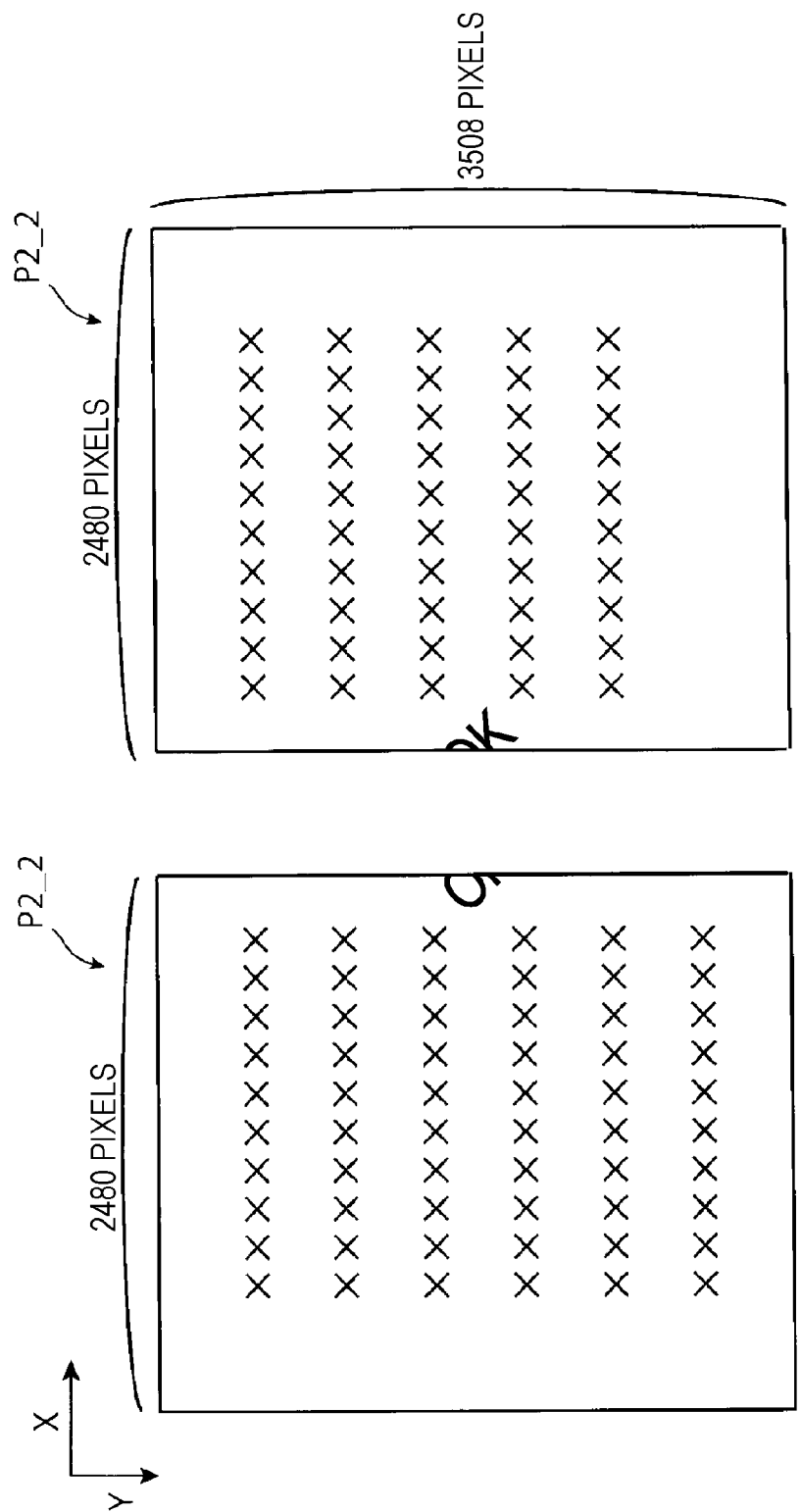
FIG. 20 is a diagram illustrating two final second images obtained by dividing the first image illustrated in FIG. 15 in two.

FIG. 20 is a diagram illustrating two final second images P2_2 obtained by dividing the first image P1_2 illustrated in FIG. 15 in two.

FIGS. 18 to 20 are the same as FIGS. 11 to 13, respectively, in the first example except for the word "OK" is included, and description with reference thereto is omitted.

Figure 21:
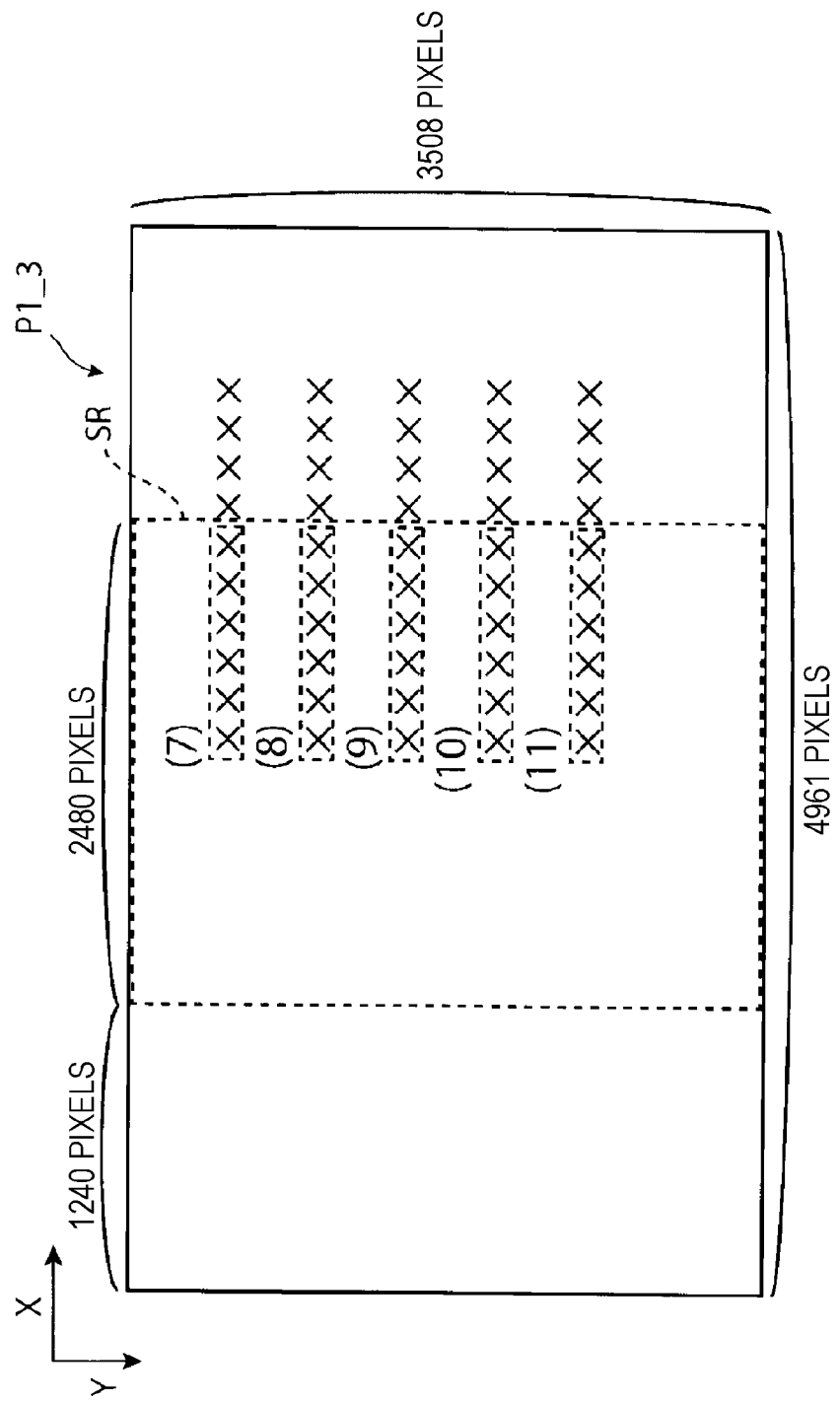
FIG. 21 is a diagram illustrating a first image different from the first image illustrated in FIG. 7 and the first image illustrated in FIG. 15.

FIG. 21 is a diagram illustrating a first image P1_3 different from the first image P1_1 illustrated in FIG. 7 and the first image P1_2 illustrated in FIG. 15. The first image P1_3 illustrated in FIG. 21 is different from the first image P1_1 illustrated in FIG. 7 in that the left text areas (1) to (6) included in the first image P1_1 illustrated in FIG. 7 do not exist in the first image P1_3 illustrated in FIG. 21 and only the right text areas (7) to (11) exist.

Figures 22, 23:
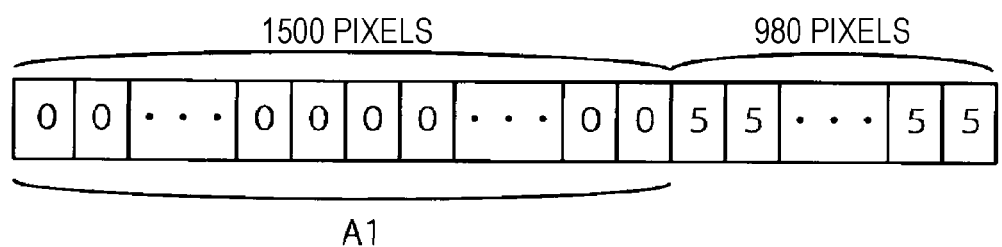
FIG. 22 is a diagram illustrating coordinates of text areas illustrated in FIG. 21.
FIG. 23 is a diagram illustrating an array for the first image illustrated in FIG. 21 prepared in step S15 illustrated in FIG. 6.

FIG. 22 is a diagram illustrating coordinates of the text areas (7) to (11) illustrated in FIG. 21. Meanings of "X", "Y", "W", and "H" in FIG. 21 are the same as in FIGS. 8 and 16.

FIG. 23 is a diagram illustrating an array for the first image P1_3 illustrated in FIG. 21 prepared in step S15 illustrated in FIG. 6.

In the array, values of leftmost 1,500 elements are zero. It is therefore determined in step S21 illustrated in FIG. 14 that the 1,500 elements form a first dividable area A1. Next, whether the center of the first dividable area A1 is located within a range of $\pm \alpha$ from the center of the search area SR is determined (step S35). Here, a is 200. In FIG. 23, the center of the first dividable area A1 is located at a 750th element from a left end of the array (i.e., the left edge of the search area SR). Since the width of the search area SR is 2,480 pixels as illustrated in FIG. 21, the center of the search area SR is located at a (2,480/2=1240)th pixel from the left edge of the search area SR. 750, which indicates the center of the first dividable area, is 490 smaller than 1,240, which indicates the center of the search area SR. That is, in this example, the center of the first area A1 is not located within the range of $\pm \alpha$ from the center of the search area SR. The result of step S35 illustrated in FIG. 14 becomes NO, and the process proceeds to step S36. In step S36, the first image P13 is divided not at the center of the first dividable area A1 but at a position closer to the center of the search area SR.

Figure 24:
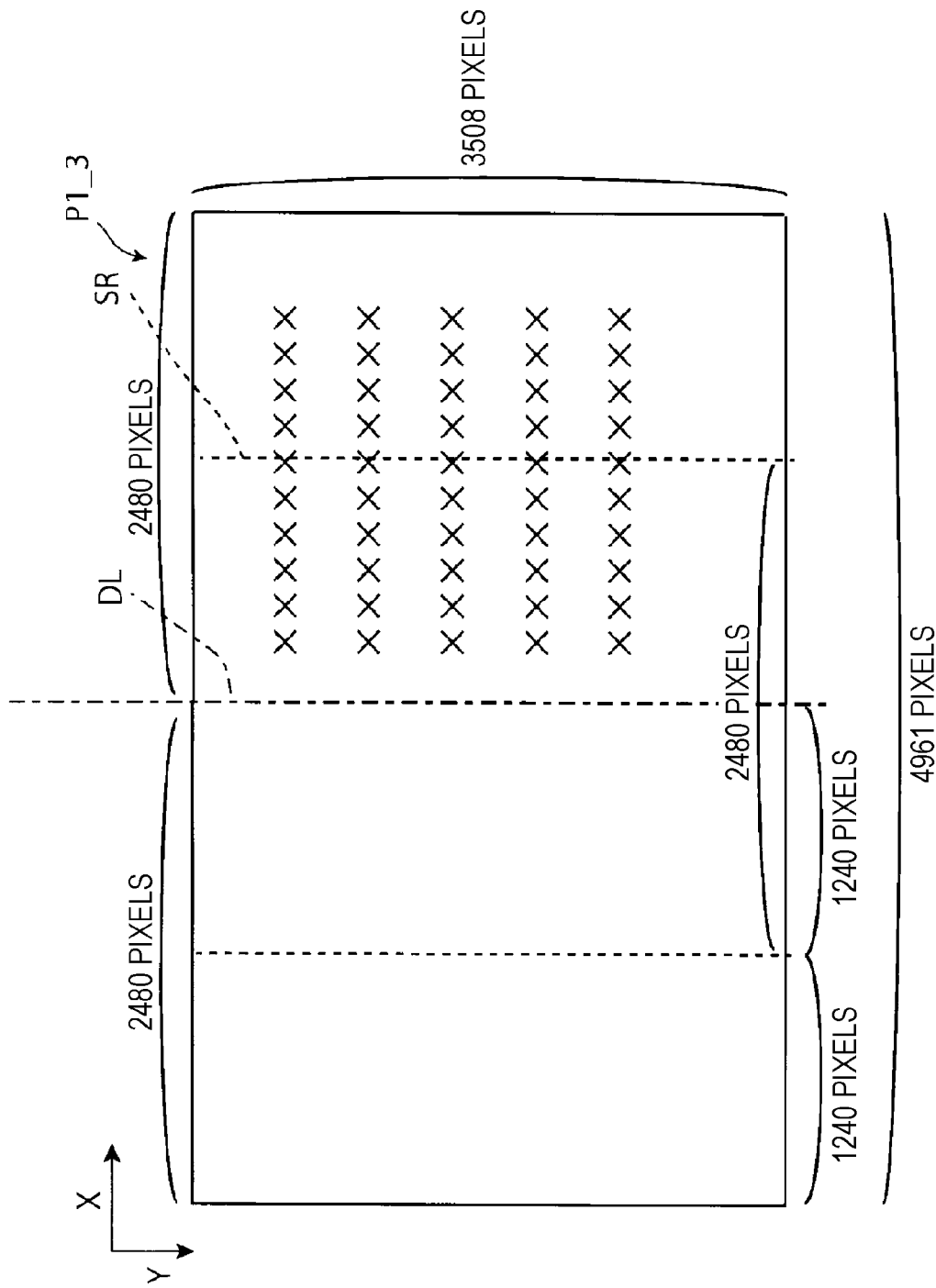
FIG. 24 is a diagram illustrating a dividing line along which the first image illustrated in FIG. 21 is divided in two.

FIG. 24 is a diagram illustrating a dividing line DL along which the first image P1_3 illustrated in FIG. 21 is divided in two.

In this example, a text area does not exist at the center of the search area SR, and the first image P1_3 is divided in two along the dividing line DL passing through the center of the search area SR. If there is a text area at the center of the search area SR, the dividing line DL is moved sideways so that the dividing line DL does not overlap the text area. Such division is performed in step S36 illustrated in FIG. 14. The same holds for step S23 illustrated in FIG. 10.

Figure 25:
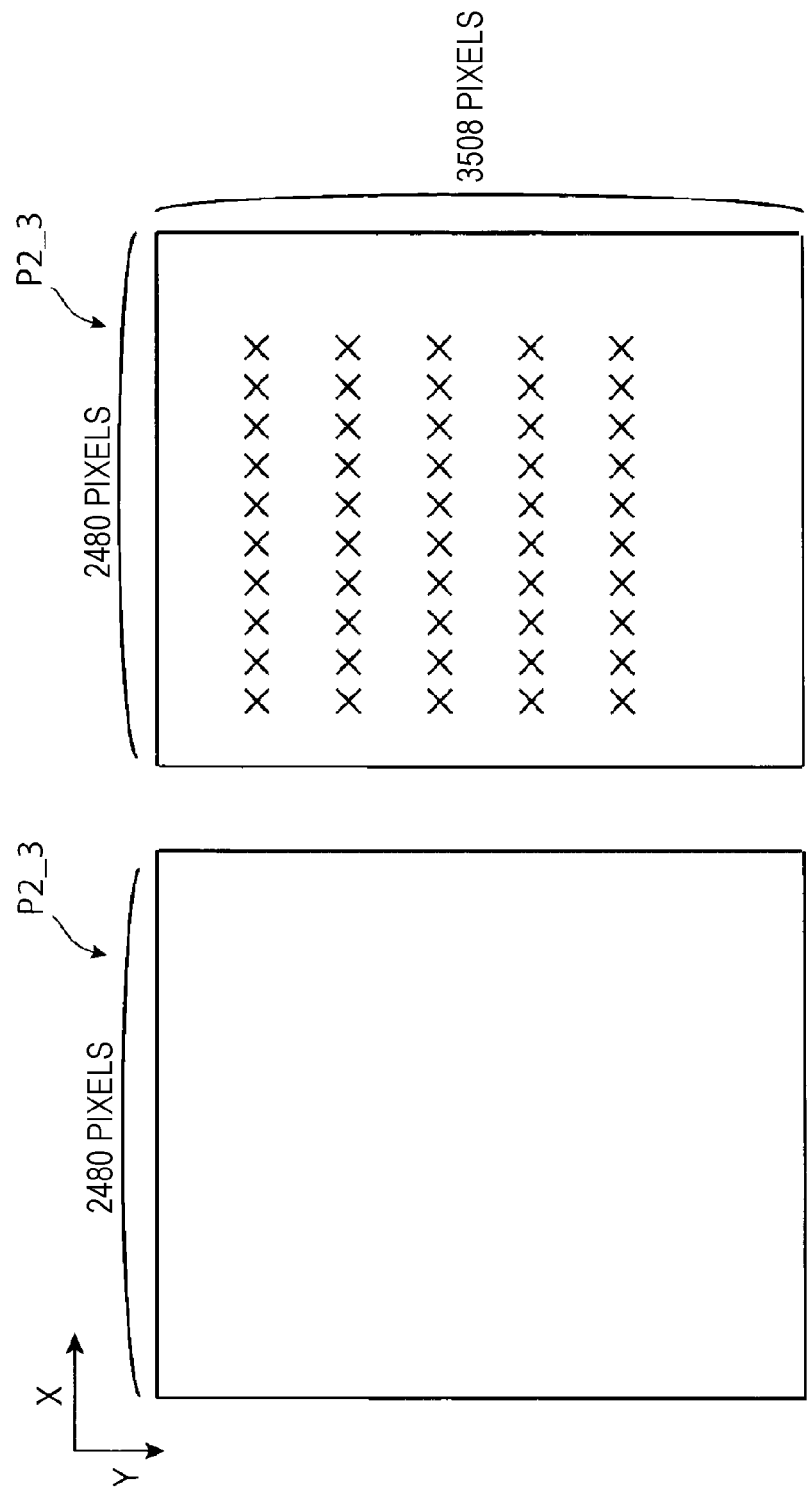
FIG. 25 is a diagram illustrating two final second images obtained by dividing the first image illustrated in FIG. 21 in two.

FIG. 25 is a diagram illustrating two final second images P2_3 obtained by dividing the first image P1_3 illustrated in FIG. 21 in two.

Since the dividing line DL passes through the center of the search area SR as illustrated in FIG. 24, the two second images P2_3 obtained as a result of the division are the same in dimension. Step S41 illustrated in FIG. 14 is therefore not performed.

Figure 26:
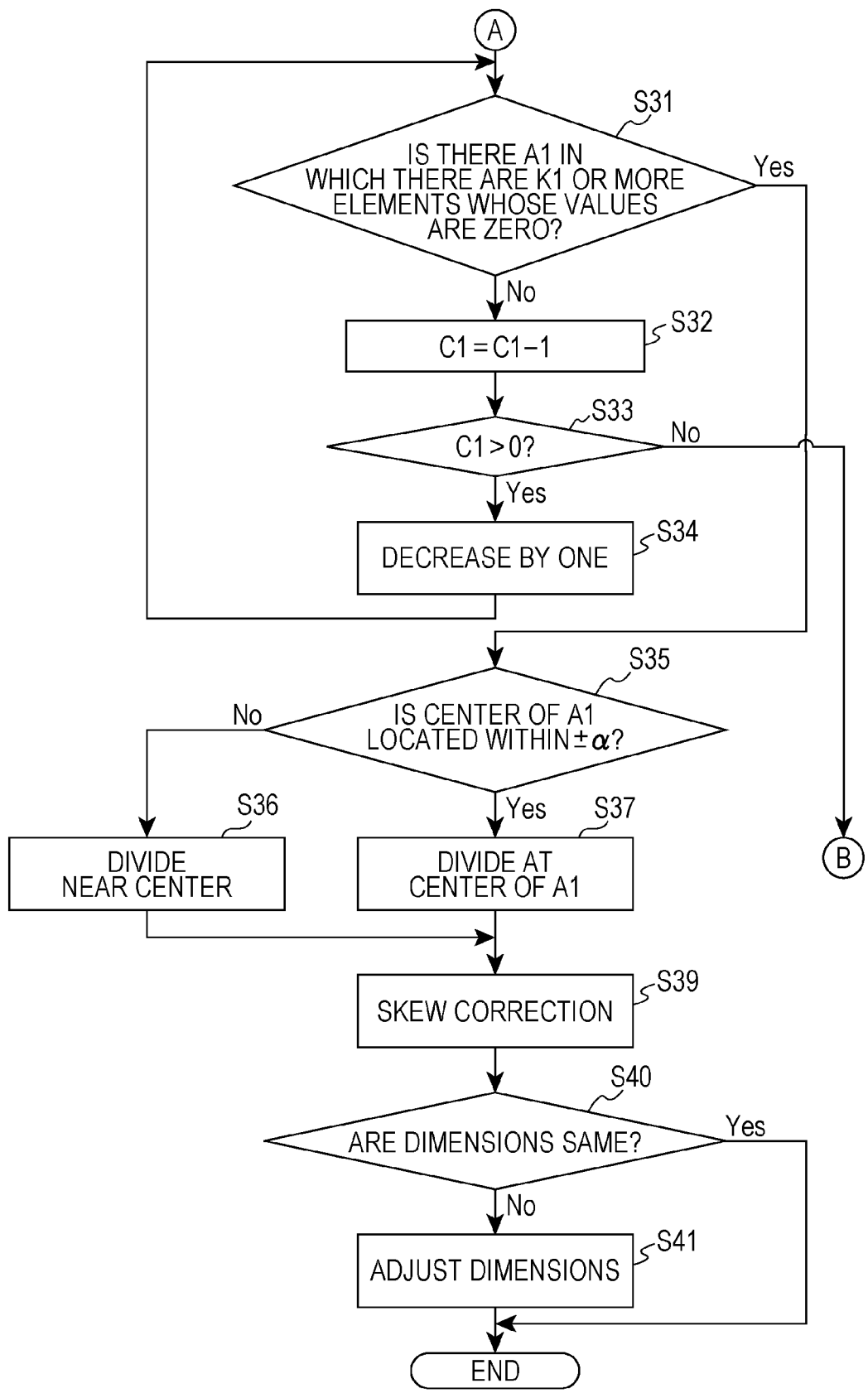
FIG. 26 is a flowchart illustrating a part of a second half of the page consecutive capturing in a third example.
Figure 29:
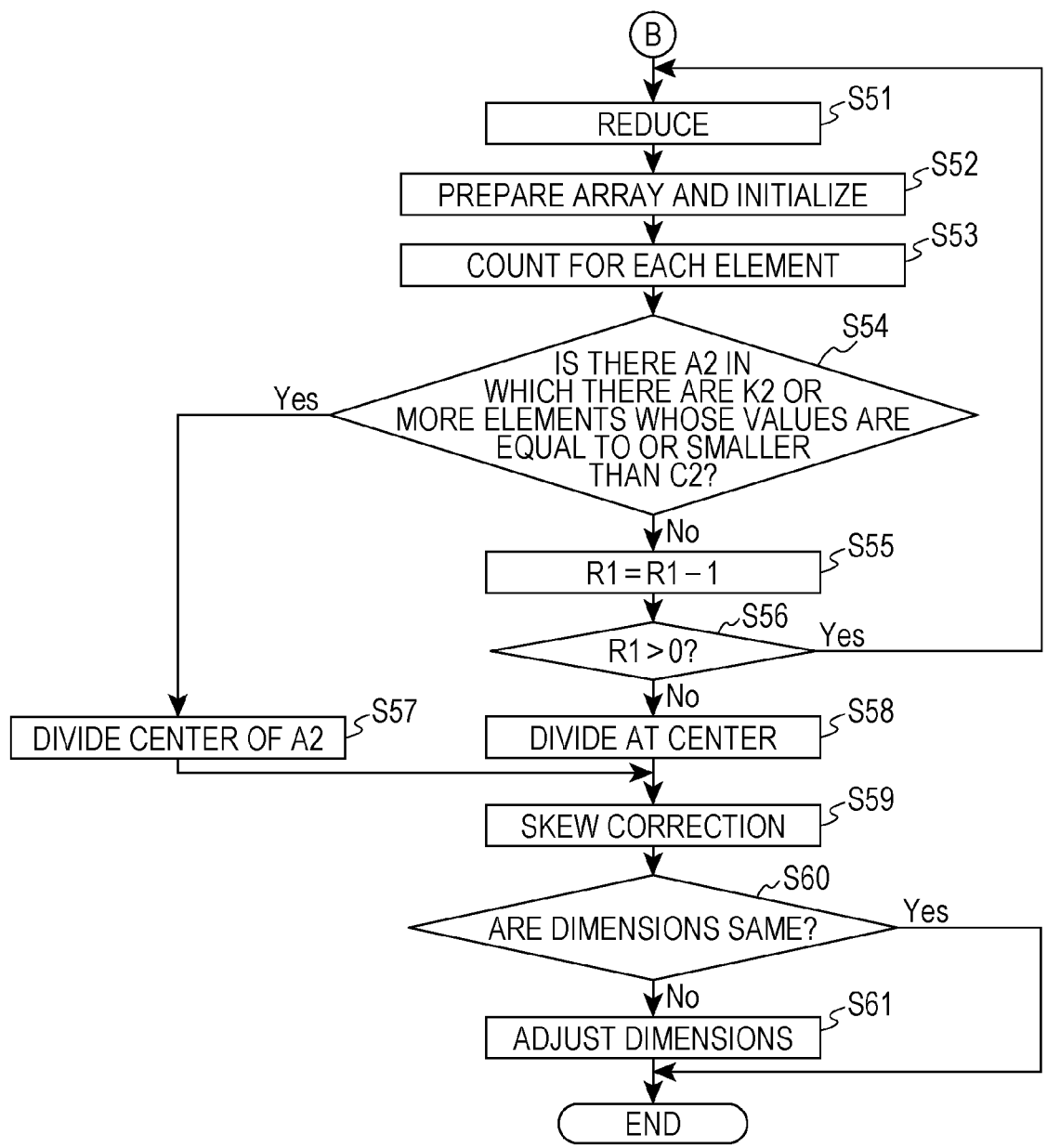
FIG. 29 is a flowchart illustrating the second half of the page consecutive capturing in the third example other than the part illustrated in FIG. 26.

FIG. 26 is a flowchart illustrating a part of a second half of the page consecutive capturing in the third example. The rest of the second half of the page consecutive capturing in the third example is illustrated in a flowchart of FIG. 29. FIG. 29 will be referred to after FIG. 26 is referred to. A first half of the page consecutive capturing in the third example is the same as that in the first and second examples illustrated in FIG. 6, and redundant illustration and description thereof is omitted.

Unlike the flowchart of FIG. 26, the flowchart of FIG. 14 in the second example includes step S38. In the second example, if the result of step S33 is NO, the process proceeds to step S38. In the third example illustrated in FIG. 26, on the other hand, step S38 is removed, and if the result of step S33 is NO, the process proceeds to steps illustrated in FIG. 29. That is, in the second example illustrated in FIG. 14, if the result of step S33 is NO, the division unit 52 no longer attempts to find a dividable area and divides the first image P1_2 at the center of the first image P1_2. In the third example, on the other hand, even if the result of step S33 is NO, the division unit 52 keeps attempting to find a dividable area by performing the steps illustrated in FIG. 29. Differences between the second example and the part of the third example illustrated in FIG. 26 are as described above, and further description with reference to FIG. 26 is omitted.

Figure 27:
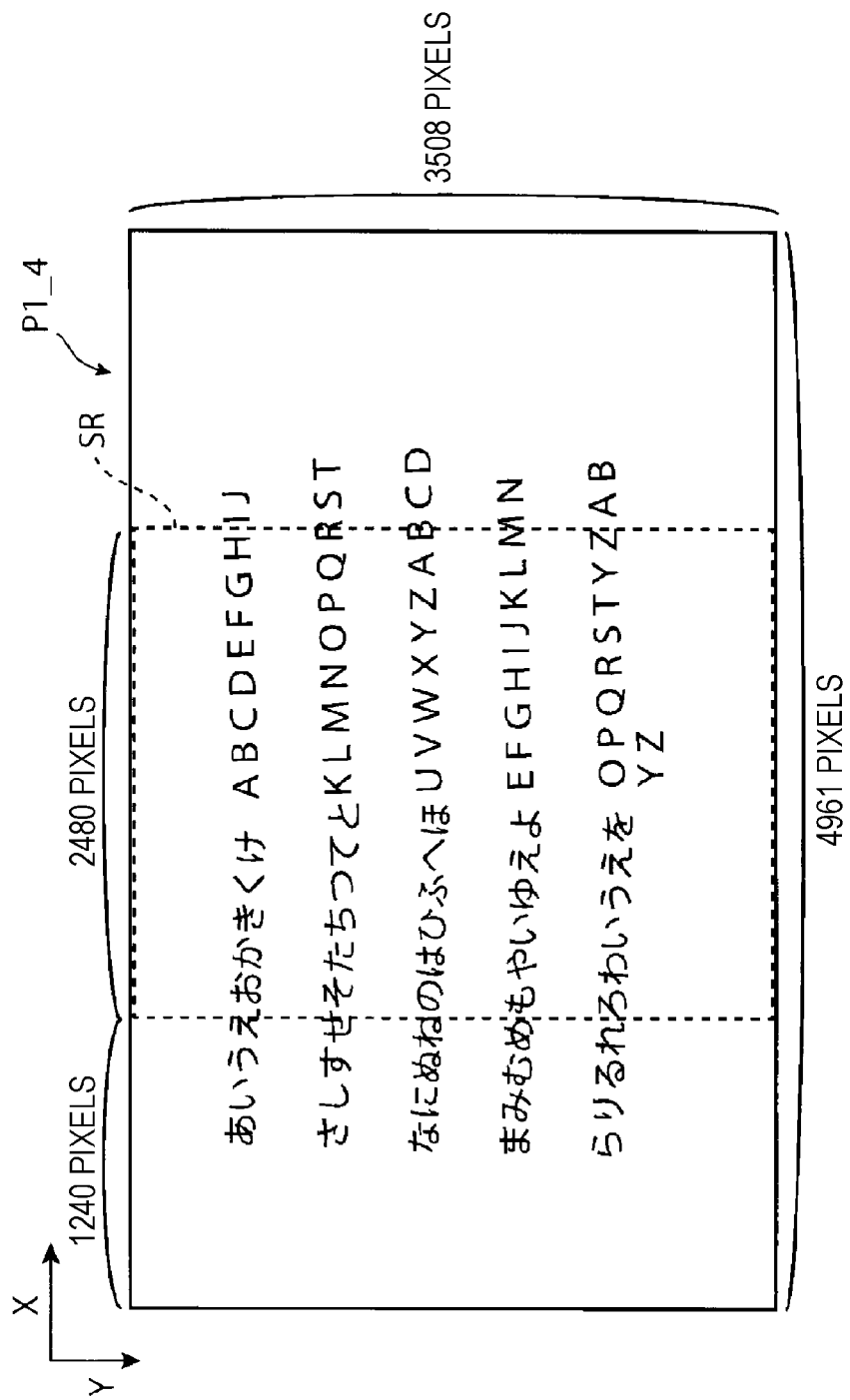
FIG. 27 is a diagram illustrating a first image different from the first images described above.

FIG. 27 is a diagram illustrating a first image P14 different from the first images P1_1, P12, and P13 described above.

In the first image P1_4, characters on two pages are almost in contact with each other. In addition, the characters on the two pages are slightly skewed in opposite directions.

The first half of the page consecutive capturing illustrated in FIG. 6 is performed on the first image P1_4 illustrated in FIG. 27.

Figure 28:
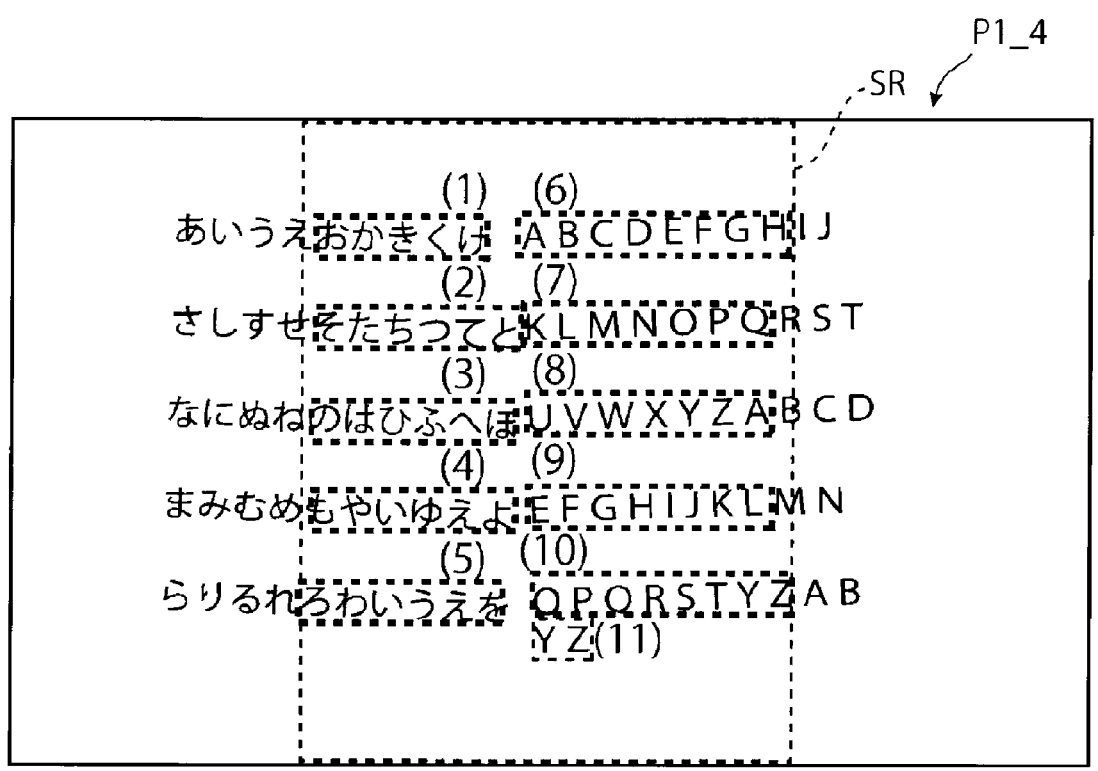
FIG. 28 is a diagram illustrating text areas of the first image illustrated in FIG. 27 in a search area.

FIG. 28 is a diagram illustrating text areas of the first image P1_4 illustrated in FIG. 27 in a search area SR.

Here, there are left text areas (1) to (5) and right text areas (6) to (11).

Although not illustrated or redundantly described, a first dividable area A1 does not appear even if steps S31 to S34 illustrated in FIG. 14 or 26 are performed on an array, like the first array illustrated in FIG. 17, generated by counting the number of these text areas until the first count threshold C1 becomes zero. The result of step S33 is therefore NO. In the second example illustrated in FIG. 14, if the result of step S33 is NO, the process proceeds to step S38, and the first image P1_2 is divided at the center of the search area SR in two. In the third example, on the other hand, the process proceeds to the steps illustrated in FIG. 29.

FIG. 29 is a flowchart illustrating the second half of the page consecutive capturing in the third example other than the part illustrated in FIG. 26.

Here, first, the text areas (1) to (11) are reduced in size by one step.

Figure 30:
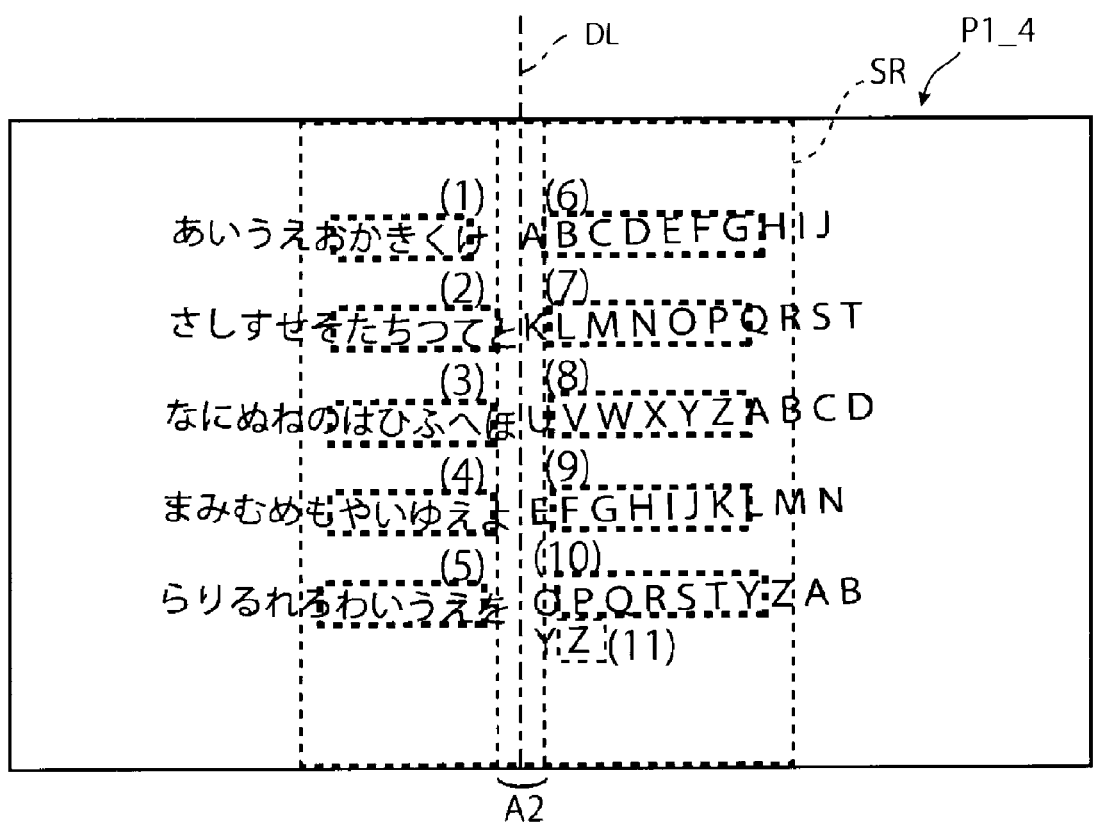
FIG. 30 is a diagram illustrating reduction in size.

FIG. 30 is a diagram illustrating the reduction in size.

FIG. 30 illustrates the text areas (1) to (11) illustrated in FIG. 28 subjected to the reduction by several steps. The text areas (1) to (11) indicated in FIG. 30 by broken lines have been reduced from those illustrated in FIG. 28. A left end of each text area has become closer to a right end in the X direction, that is, the right end has become closer to the left end. As a result, an area A2 in which there is no text area in the Y direction has appeared.

On the basis of this condition, FIG. 29 is now referred to again.

In step S51 illustrated in FIG. 29, the text areas (1) to (11) are reduced by one step. As a result, the text areas (1) to (11) are slightly reduced. It is to be noted that in the reduction, the text areas (1) to (11) on a coordinate system are reduced and characters themselves are not reduced. After the reduction, an array of elements are prepared and initialized as in steps S15 and S16 illustrated in FIG. 6 (step S52), and the number of text areas in the Y direction is counted for each element (step S53). Whether there is a second dividable area A2 in which there are the second successive threshold K2 or more elements whose values are equal to or smaller than the second count threshold C2 is then determined with reference to the array (step S54). It is assumed, for example, that the second count threshold C2 is zero and the second successive threshold K2 is 30. In this case, therefore, whether there is a second dividable area A2 in which there are 30 or more elements whose values are zero is determined in step S54. If a second dividable area A2 has appeared as illustrated in FIG. 30, the process proceeds to step S57, and the first image P1_4 is divided in two along a dividing line DL passing through, in the Y direction, the center of the second dividable area A2.

If a result of step S54 is NO, on the other hand, the first count threshold R1 is decreased by 1 (step S55). The first count threshold R1 is a coefficient for determining how many times the reduction (step S51) is to be performed and is 3, for example, as an initial value. In this case, if step S55 is performed for the first time, the first count threshold R1 becomes 2. Whether the first count threshold R1 subjected to the reduction is larger than zero is then determined (step S56), and if so, the process returns to step S51, and the reduction is performed again.

If a result of step S56 is NO, the process proceeds to step S58. In step S58, the first image P1_4 is divided in two along a dividing line DL passing through, in the Y direction, the center of the search area SR.

Figure 31:
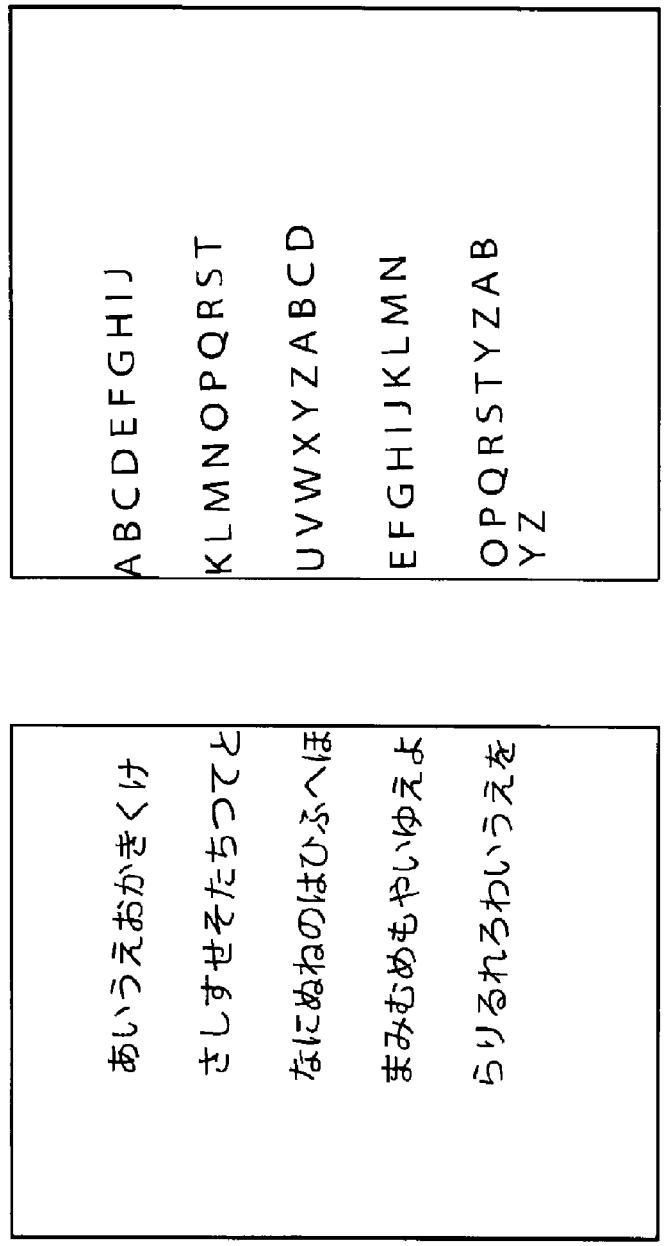
FIG. 31 is a diagram illustrating two images obtained as a result of division.

FIG. 31 is a diagram illustrating two images obtained as a result of the division.

As illustrated in FIG. 27, the characters on the two pages of the first image P14 before the division are slightly skewed in the opposite directions. The characters are therefore slightly skewed, too, in the two images obtained as a result of the division illustrated in FIG. 31. Since the characters on the two pages of the first image P1_4 before the division are skewed in the opposite directions, it is difficult to correct the skew of the characters. In the case of the two images obtained as a result of the division, on the other hand, the characters on each image are skewed in the same direction. Skew correction, in which images are rotated to correct positions of characters, can therefore be performed. In step S59, the skew correction is performed. The same operation is performed in skew correction in step S26 illustrated in FIG. 10 and step S39 illustrated in FIG. 14. If dimensions of the two images are different from each other (step S60), the dimensions are adjusted to the same value (step S61). The adjustment of dimensions has been described with reference to FIG. 12, and redundant description thereof is omitted.

Figure 32:
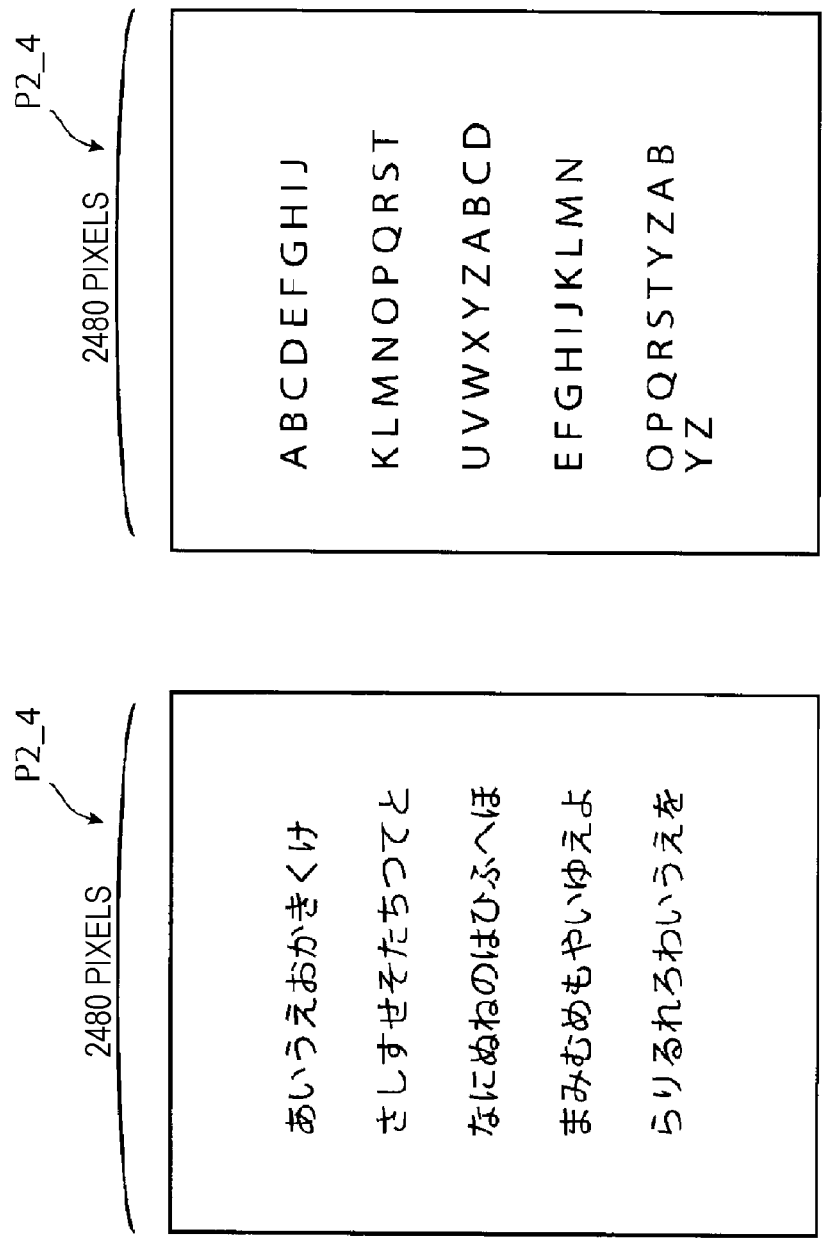
FIG. 32 is a diagram illustrating two final second images obtained by dividing the first image illustrated in FIG. 27 in two.

FIG. 32 is a diagram illustrating two final second images P2_4 obtained by dividing the first image P1_4 illustrated in FIG. 27 in two. The skew of the characters has been corrected through the skew correction, and the two second images 2_4 having the same dimension have been obtained.

Next, the fourth example will be described.

Although the characters on the two pages are close to each other in the first image P1_4 illustrated in FIG. 27, the left text areas (1) to (5) and the right text areas (6) to (11) are recognized as discrete text areas in the OCR performed in step S13 illustrated in FIG. 6.

Figure 33:
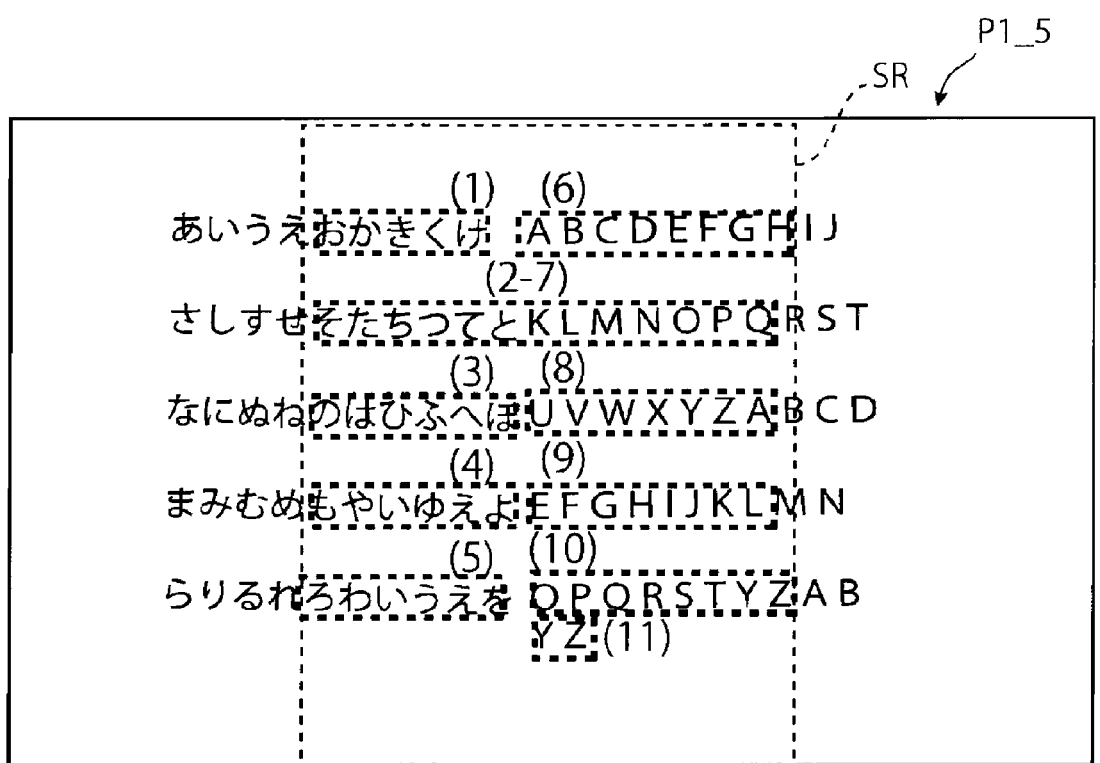
FIG. 33 is a diagram illustrating another first image similar to the first image illustrated in FIG. 27.

FIG. 33 is a diagram illustrating another first image P1_5 similar to the first image P1_4 illustrated in FIG. 27.

The first image P1_5 illustrated in FIG. 33 includes the text areas (1) to (11) recognized in the OCR. In FIG. 33, however, unlike in FIG. 28, the left text area (2) and the right text area (7) are not recognized as discrete text areas but as a single text area (2-7).

Figure 34:
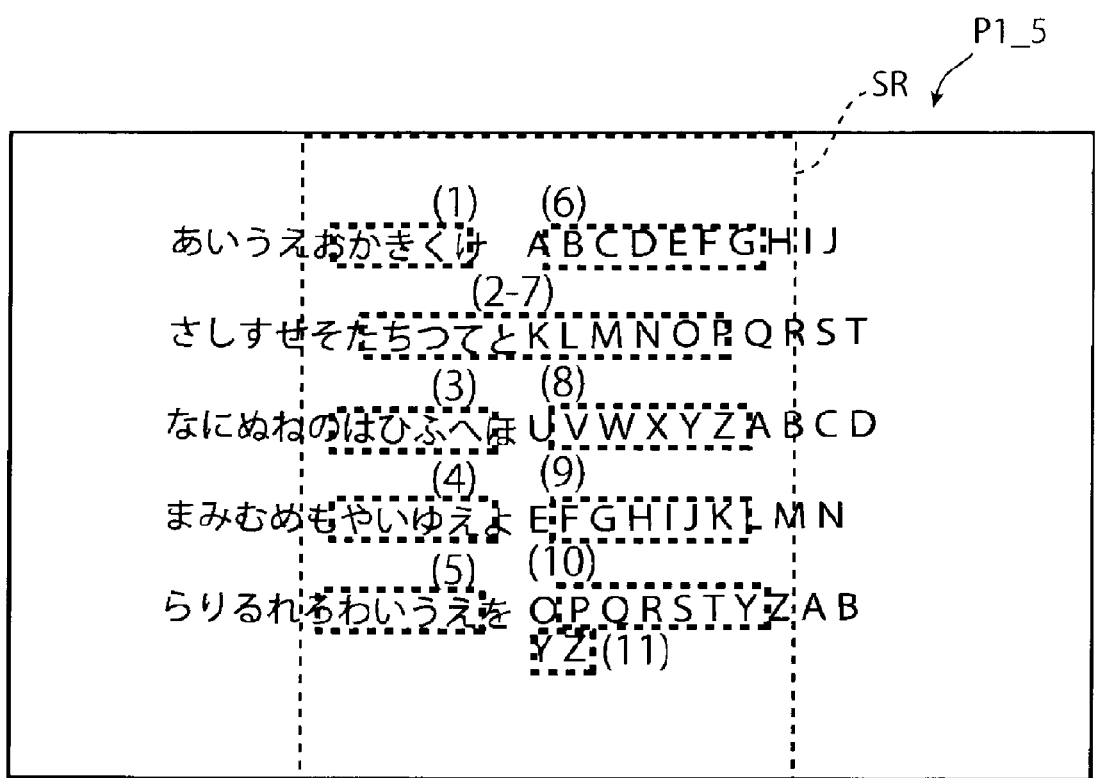
FIG. 34 is a diagram illustrating text areas illustrated in FIG. 33 subjected to the reduction.

FIG. 34 is a diagram illustrating the text areas (1) to (11) illustrated in FIG. 33 subjected to the reduction.

As illustrated in FIG. 34, when left and right text areas are connected to each other, text areas might not be separated into two pages even after reduction.

A process performed in the fourth example will be described on the basis of the above description with reference to FIGS. 33 and 34.

In the fourth example, as in the first to third examples, the steps illustrated in FIG. 6 are performed in the first half of the page consecutive capturing. In the second half, the steps illustrated in FIG. 26 are performed first as in the third example.

Figure 35:
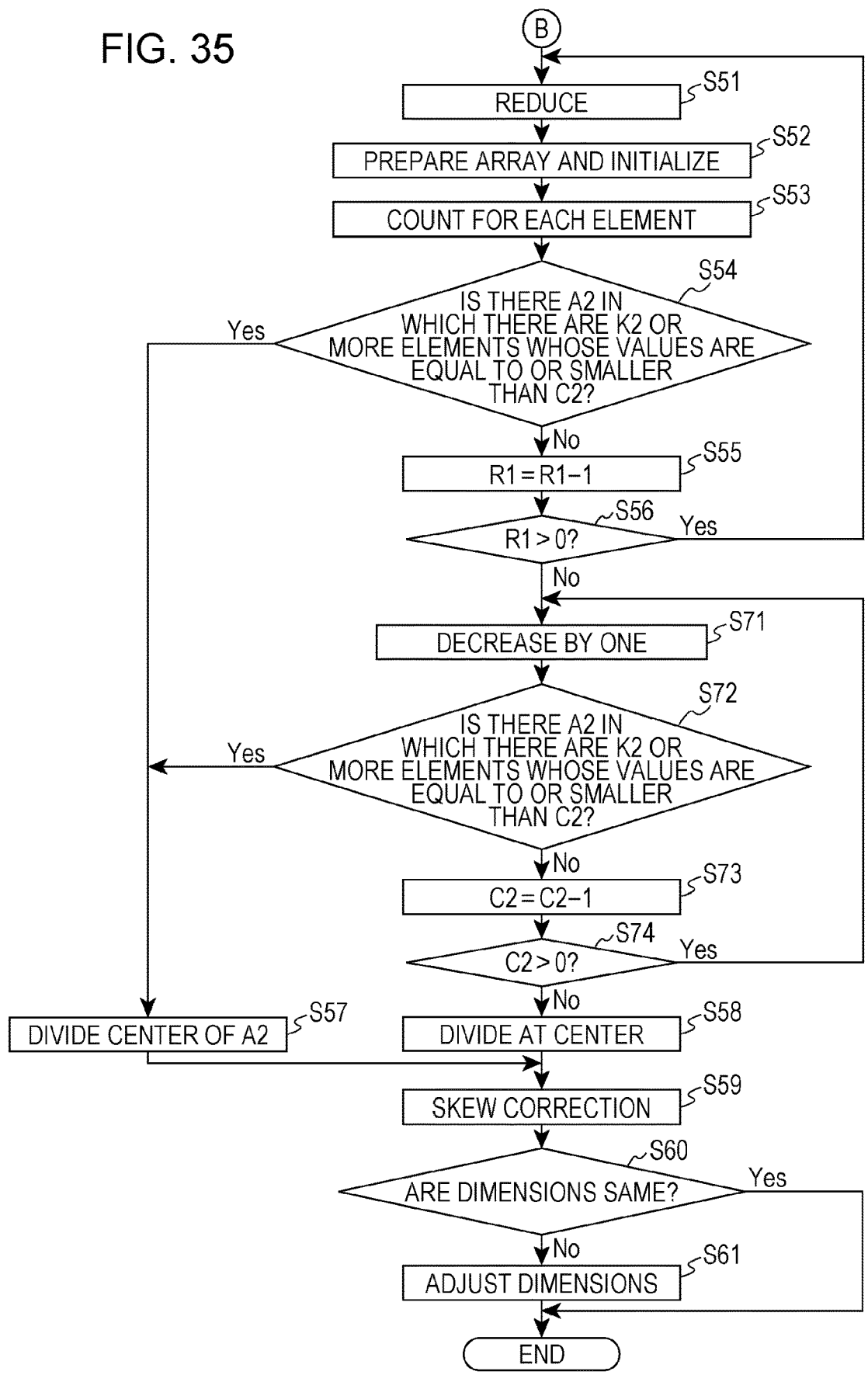
FIG. 35 is a flowchart illustrating a second half of the page consecutive capturing in a fourth example other than the part illustrated in FIG. 26.

In the fourth example, steps illustrated in FIG. 35 are performed after the result of step S33 illustrated in FIG. 26 becomes NO.

FIG. 35 is a flowchart illustrating a second half of the page consecutive capturing in the fourth example except for the part illustrated in FIG. 26.

Unlike the flowchart of FIG. 29 in the third example, the flowchart of FIG. 35 includes steps S71 to S74 between steps S51 to S56 and steps S57 to S61 illustrated in FIG. 29. That is, in the third example illustrated in FIG. 29, if the result of step S56 is NO, the division unit 52 no longer attempts to find a dividable area and divides the first image P13 at the center of the search area SR. In the fourth example illustrated in FIG. 35, on the other hand, even if the result of step S56 is NO, the division unit 52 keeps attempting to find a dividable area by performing additional steps.

Steps S71 to S74 are the same as steps S31 to S34, respectively. Here, however, an array generated in step S53 after the reduction in step S51 is performed the same number of times as the first count threshold R1 is used. An initial value of the second count threshold C2 is zero here in order to maintain consistency with FIGS. 33 and 34 used to describe the fourth example. In the example illustrated in FIGS. 33 and 34, only one pair of left and right text areas are connected to each other, namely the text area (2-7). The second dividable area A2 illustrated in FIG. 30 therefore appears by decreasing the value of each element of the array one by one in step S71. As a result, a result of step S72 becomes YES, and the process proceeds to step S57. If there are a plurality of pairs of left and right text areas connected to each other and the initial value of the second count threshold C2 is 3, for example, steps S71 to S74 are performed C2=3 times at maximum. If, meanwhile, the result of step S72 becomes YES, the process proceeds to step S57. If the result of step S72 remains NO even after steps S71 to S74 are performed C2=3 times, the process proceeds to step S58, and the first image P1_5 is divided in two at the center of the search area SR.

Although the first count threshold C1 and the second count threshold C2 are predetermined fixed values, namely C1=3 and C2=0, in the above exemplary embodiment, the first count threshold C1 and the second count threshold C2 need not be fixed values and may be determined for each image, instead. The first count threshold C1 and the second count threshold C2 may be one-fifth of a maximum value of values of elements of an array such as that illustrated in FIG. 9 or half an average of values of elements of an array.

Although the first successive threshold K1 and the second successive threshold K2 are predetermined fixed values, namely K1=500 and K2=30, in the above exemplary embodiment, the first successive threshold K1 and the second successive threshold K2 need not be fixed values and may be determined for each image, instead. If there are a plurality of discrete areas in the array illustrated in FIG. 9 in which the value of zero continues, for example, the first successive threshold K1 and the second successive threshold K2 may be adjusted such that small areas are ignored.

The first count threshold R1, too, may be adjusted for each image, instead.

Although binary images are assumed in the above exemplary embodiment without particularly providing description, the exemplary embodiment may also be applied to multi-valued images after binarization is performed. In the case of a color image, luminance information, for example, may be extracted and binarized.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a search unit that searches a search area, which is a part of a first image extending over two pages included in the first image, for a dividable area, the first image being indicated by first image data; and
a division unit that generates second image data indicating two second images, each of which corresponds to one of the two pages, by dividing the first image along a dividing line passing through, in a second direction, which is perpendicular to a first direction, the dividable area found by the search unit, the first direction being a direction across the two pages,
wherein the search unit includes
a recognition section that recognizes text areas in the search area, a counting section that counts a number of the text areas arranged in the second direction for each of a plurality of pixels arranged in the search area in the first direction, and wherein the search unit searches for the dividable area on a basis of distribution of values of the plurality of pixels obtained by the counting section.

2. The image processing apparatus according to claim 1, wherein the plurality of pixels are intermittently arranged in the first direction.

3. The image processing apparatus according to claim 1, wherein the search unit searches for a first dividable area in which there are, in the first direction, a first successive threshold or more pixels associated with a value obtained by the counting section equal to or smaller than a first count threshold, and wherein the division unit divides the first image along a dividing line passing through the first dividable area.

4. The image processing apparatus according to claim 2, wherein the search unit searches for a first dividable area in which there are, in the first direction, a first successive threshold or more pixels associated with a value obtained by the counting section equal to or smaller than a first count threshold, and wherein the division unit divides the first image along a dividing line passing through the first dividable area.

5. The image processing apparatus according to claim 3, wherein, if the first dividable area does not exist, the division unit divides the first image at a geometrically central position in the first direction.

6. The image processing apparatus according to claim 1, wherein the search unit searches for a first dividable area in which there are, in the first direction, a first successive threshold or more pixels associated with a value of zero obtained by the counting section, and wherein, if the first dividable area exists, the division unit divides the first image along a dividing line passing through the first dividable area.

7. The image processing apparatus according to claim 2, wherein the search unit searches for a first dividable area in which there are, in the first direction, a first successive threshold or more pixels associated with a value of zero obtained by the counting section, and wherein, if the first dividable area exists, the division unit divides the first image along a dividing line passing through the first dividable area.

8. The image processing apparatus according to claim 6, wherein the search unit includes a first subtraction section that, if the first dividable area does not exist, decreases one by one the value of each pixel, which has been obtained by counting the number of lines in the text areas, and wherein, if the first dividable area appears before the first subtraction section is caused to operate more than a first count threshold, the division unit divides the first image along the dividing line passing through the first dividable area.

9. The image processing apparatus according to claim 3, wherein the search unit includes a reduction section that, if the first dividable area does not exist, reduces in size the text areas recognized by the recognition section and causes the counting section to operate again, and wherein, if a second dividable area in which there are, in the first direction, a second successive threshold or more pixels whose values are equal to smaller than a second count threshold appears before the reduction section is caused to operate more than the first count threshold, the division unit divides the first image along a dividing line passing through the second dividable area.

10. The image processing apparatus according to claim 8, wherein the search unit includes a reduction section that, if the first dividable area does not exist, reduces in size the text areas recognized by the recognition section and causes the counting section to operate again, and wherein, if a second dividable area in which there are, in the first direction, a second successive threshold or more pixels whose values are equal to smaller than a second count threshold appears before the reduction section is caused to operate more than the first count threshold, the division unit divides the first image along a dividing line passing through the second dividable area.

11. The image processing apparatus according to claim 9, wherein, if the second dividable area does not appear even after the reduction section is caused to operate a same number of times as the first count threshold, the division unit divides the first image at a geometrically central position in the first direction.

12. The image processing apparatus according to claim 9, wherein the search unit includes a second subtraction section that, if the second dividable area does not appear even after the reduction section is caused to operate a same number of times as the first count threshold, decreases one by one the value of each pixel obtained by the counting section by causing the reduction section to operate the same number of times as the first count threshold, and wherein, if the second dividable area appears before the second subtraction section is caused to operate more than the second count threshold, the division unit divides the first image along the dividing line passing through the second dividable area.

13. The image processing apparatus according to claim 12, wherein, if the second dividable area does not appear even after the second subtraction section operates a same number of times as the second count threshold, the division unit divides the first image at a geometrically central position in the first direction.

14. The image processing apparatus according to claim 1, further comprising:

an adjustment unit that, if dimensions, in the first direction, of the two second images indicated by the second image data generated as a result of the division performed by the division unit are different from each other, adjusts the dimensions of the two second images.

15. The image processing apparatus according to claim 1, further comprising:

a correction unit that corrects skew of text areas for each of the two second images indicated by the second image data generated by the division performed by the division unit.

16. A non-transitory computer readable medium storing a program that is executed in an information processing apparatus and that causes the information processing apparatus to execute a process for processing an image, the process comprising:

searching a search area, which is a part of a first image extending over two pages included in the first image, for a dividable area, the first image being indicated by first image data; and generating second image data indicating two second images, each of which corresponds to one of the two pages, by dividing the first image along a dividing line passing through, in a second direction, which is perpendicular to a first direction, the dividable area found in the searching, the first direction being a direction across the two pages,
wherein the process of searching the search area includes recognizing text areas in the search area,
counting a number of the text areas arranged in the second direction for each of a plurality of pixels arranged in the search area in the first direction, and
wherein the dividable area is searched on a basis of distribution of values of the plurality of pixels.

* * * * *